US012578616B2

(12) United States Patent
Park et al.

(10) Patent No.: US 12,578,616 B2
(45) Date of Patent: Mar. 17, 2026

(54) METAOPTICS AND ELECTRONIC APPARATUSES INCLUDING THE SAME

(71) Applicants:Samsung Electronics Co., Ltd., Suwon-si (KR); CALIFORNIA INSTITUTE OF TECHNOLOGY, Pasadena, CA (US)

(72) Inventors: Junghyun Park, Suwon-si (KR); Meir Grajower, Pasadena, CA (US); Harry Atwater, South Pasadena, CA (US); Ruzan Sokhoyan, Pasadena, CA (US)

(73) Assignees: SAMSUNG ELECTRONICS CO., LTD., Suwon-si (KR); CALIFORNIA INSTITUTE OF TECHNOLOGY, Pasadena, CA (US)

( * ) Notice: Subject to any disclaimer, the term of this patent is extended or adjusted under 35 U.S.C. 154(b) by 621 days.

(21) Appl. No.: 17/971,112

(22) Filed: Oct. 21, 2022

(65) Prior Publication Data

US 2023/0131778 A1    Apr. 27, 2023

Related U.S. Application Data

(60) Provisional application No. 63/270,826, filed on Oct. 22, 2021.

(30) Foreign Application Priority Data

Nov. 11, 2021    (KR) ........................ 10-2021-0155163

(51) Int. Cl.
G02F 1/29 (2006.01)
(52) U.S. Cl.
CPC .................................... G02F 1/291 (2021.01)
(58) Field of Classification Search
None
See application file for complete search history.

(56) References Cited

U.S. PATENT DOCUMENTS

| 5,222,071 A | 6/1993 | Pezeshki et al. |
| 10,128,387 B1 * | 11/2018 | Liu ..................... H01S 5/34366 |

(Continued)

FOREIGN PATENT DOCUMENTS

| CN | 113140961 A | 7/2021 |
| JP | 2008-66442 A | 3/2008 |

(Continued)

OTHER PUBLICATIONS

Communication dated Apr. 18, 2025, issued by the Korean Intellectual Property Office in Korean Application No. 10-2021-0155163.

(Continued)

*Primary Examiner* — Sharrief I Broome
*Assistant Examiner* — Journey F Sumlar
(74) *Attorney, Agent, or Firm* — Sughrue Mion, PLLC

(57) ABSTRACT

Provided is a metaoptic configured to modulate incident light in a wavelength band, the metaoptic including a plurality of meta units respectively including a first semiconductor layer, an active layer provided on the first semiconductor layer, the active layer having a multiple quantum well structure and a refractive index variable based on a voltage applied thereto, and a second semiconductor layer provided on the active layer and doped with a polarity opposite to a polarity of the first semiconductor layer, wherein at least one of the plurality of meta units includes a plurality of first elements having a cylindrical shape and periodically provided spaced apart from each other in a first direction, and a plurality of second elements connecting the plurality of first elements to each other, and wherein the plurality of meta units are provided in a second direction that is perpendicular to the first direction.

21 Claims, 20 Drawing Sheets

(56)     References Cited

U.S. PATENT DOCUMENTS

| | | |
|---|---|---|
| 2009/0261318 A1 | 10/2009 | Cheong |
| 2017/0018685 A1* | 1/2017 | Cho ..................... H10H 20/817 |
| 2017/0082905 A1* | 3/2017 | Lee ........................ G02B 26/04 |
| 2018/0196137 A1* | 7/2018 | Lee ........................ G01S 7/481 |
| 2018/0278023 A1* | 9/2018 | Na ..................... H01S 5/02469 |
| 2019/0018299 A1* | 1/2019 | Park ........................ G02F 1/292 |
| 2020/0059072 A1 | 2/2020 | Lee |
| 2020/0076163 A1* | 3/2020 | Han .................... H01S 5/18391 |
| 2020/0271843 A1* | 8/2020 | Kim ..................... G02B 5/3083 |
| 2021/0405270 A1* | 12/2021 | Han ..................... G02B 5/1871 |
| 2022/0197105 A1 | 6/2022 | Park et al. |

FOREIGN PATENT DOCUMENTS

| | | |
|---|---|---|
| KR | 10-0986557 B1 | 10/2010 |
| KR | 10 2018 0082305 A | 7/2018 |
| KR | 10-2117084 B1 | 6/2020 |

OTHER PUBLICATIONS

Communication dated Nov. 26, 2025, issued by the Korean Ministry of Intellectual Property in Korean Application No. 10-2021-0155163.

* cited by examiner

1

METAOPTICS AND ELECTRONIC APPARATUSES INCLUDING THE SAME

CROSS-REFERENCE TO RELATED APPLICATIONS

This application is based on and claims the benefit of U.S. Provisional Patent Application No. 63/270,826, filed on Oct. 22, 2021, in the United States Patent and Trademark Office, and claims priority to Korean Patent Application No. 10-2021-0155163, filed on Nov. 11, 2021, in the Korean Intellectual Property Office, the disclosures of which are incorporated by reference herein in their entireties.

BACKGROUND

1. Field

Example embodiments of the present disclosure relate to metaoptics and electronic apparatuses including the metaoptics.

2. Description of Related Art

Metaoptics capable of changing characteristics of incident light, such as the transmission/reflection/scattering characteristics, phase, amplitude, polarization, intensity, and path of incident light, are used in various optical apparatuses. Light modulation devices having various structures have been proposed to control the properties of light in an optical system. For example, liquid crystals having optical anisotropy, or microelectromechanical system (MEMS) structures using micro-mechanical movements of light blocking/reflecting elements are used in general light modulation devices. However, such optical modulation devices have a limited operation response time because of characteristics of driving methods.

Recently, there has been an attempt to apply meta-structures to metaoptics. Meta-structures have thicknesses, patterns, periods, or the like, which are less than the wavelength of incident light. Various metaoptics for modulating incident light by changing resonance conditions of meta-structures have been proposed, and research into methods of increasing modulation efficiency has been constantly conducted.

SUMMARY

One or more example embodiments provide metaoptics having high reflectance in a given wavelength band.

One or more example embodiments also provide metaoptics configured to induce a large phase shift according to refractive index variations in a given wavelength band.

One or more example embodiments also provide metaoptics having a high quality factor (Q-factor) in a given wavelength band.

One or more example embodiments also provide metaoptics having improved modulation efficiency.

One or more example embodiments also provide electronic apparatuses employing metaoptics.

Additional aspects will be set forth in part in the description which follows and, in part, will be apparent from the description, or may be learned by practice of example embodiments of the disclosure.

According to an aspect of an example embodiment, there is provided a metaoptic configured to modulate incident light in a wavelength band, the metaoptic including a plurality of meta units respectively including a first semiconductor layer, an active layer provided on the first semiconductor layer, the active layer having a multiple quantum well structure and a refractive index variable based on a voltage applied thereto, and a second semiconductor layer provided on the active layer and doped with a polarity opposite to a polarity of the first semiconductor layer, wherein at least one of the plurality of meta units includes a plurality of first elements having a cylindrical shape and periodically provided spaced apart from each other in a first direction, and a plurality of second elements connecting the plurality of first elements to each other, and wherein the plurality of meta units are provided in a second direction that is perpendicular to the first direction.

The metaoptic may further include a distributed Bragg reflector (DBR) layer provided on a side of the plurality of meta units.

The plurality of first elements may be configured such that the incident light undergoes Mie resonance, and the plurality of first elements and the plurality of second elements may be configured such that the incident light undergoes guided mode resonance in the first direction.

At least one of the plurality of second elements may have a rectangular cross-section.

Voltages may be independently applied to the plurality of meta units.

A period of the plurality of first elements may be less than a center wavelength of the wavelength band, and a period of the plurality of meta units provided in the second direction may be less than the center wavelength of the wavelength band.

A diameter of at least one of the plurality of first elements having a cylindrical shape may be less than $\frac{1}{2}$ of a center wavelength of the wavelength band.

A thickness of at least one of the plurality of first elements may be less than a center wavelength of the wavelength band, and a thickness of at least one of the plurality of second elements may be equal to a thickness of adjacent one of the plurality of first elements.

When an electric field of 100 kV/cm is applied to the active layer, the metaoptic may have an absorption coefficient less than or equal to 240 $cm^{-1}$ in the wavelength band.

A difference between the refractive index of the active layer when an electric field of about 100 kV/cm is applied to the active layer and the refractive index of the active layer when no electric field is applied to the active layer may be 0.001 or more.

The first semiconductor layer, the active layer, and the second semiconductor layer may include a Group III-V compound semiconductor material, and a center wavelength of the wavelength band may be 300 nm to 1 mm.

The active layer may include at least one of gallium arsenide (GaAs), indium gallium arsenide (InGaAs), gallium nitride (GaN), aluminum gallium nitride (AlGaN), indium phosphide (InP), and gallium phosphide (GaP).

The wavelength band may range from 1520 nm to 1580 nm, the plurality of meta units may include indium phosphide (InP) and have a period that ranges from 300 nm to 1500 nm, the plurality of first elements, having a cylindrical shape, may have a period that ranges from 300 nm to 1500 nm, a diameter that ranges from 100 nm to 600 nm, and a thickness that ranges from 300 nm to 1500 nm, and the plurality of second elements may have a width that ranges from 100 nm to 500 nm and a thickness that ranges from 300 nm to 1500 nm.

In the wavelength band, the metaoptic may have a reflectance that is greater than or equal to 90%, and a maximum phase shift by the metaoptic based on wavelength variations may be greater than or equal to $\pi$ rad, or the metaoptic may have a reflectance that is greater than or equal to 90% in a refractive index variation region for light having a wavelength in the wavelength band, and a maximum phase shift by the metaoptic based on refractive index variations may be greater than or equal to $\pi$ rad.

According to another aspect of an example embodiment, there is provided a metaoptic for modulating incident light in a wavelength band, the metaoptic including a dielectric layer, and a plurality of first meta units having a cylindrical shape, the plurality of first meta units being periodically provided on the dielectric layer and spaced apart from each other in a first direction and a second direction perpendicular to the first direction, wherein each of the plurality of first meta units may include a first semiconductor layer, an active layer provided on the first semiconductor layer, the active layer having a multiple quantum well structure and a refractive index variable based on a voltage applied thereto, and a second semiconductor layer provided on the active layer and doped with a polarity opposite to a polarity of the first semiconductor layer, wherein voltages are independently applied to the plurality of first meta units, and wherein the plurality of first meta units are configured to two-dimensionally steer the incident light.

In the wavelength band, a maximum phase shift by wavelength variations may be greater than or equal to $\pi$ rad, or a maximum phase shift by refractive index variations in the wavelength band may be greater than or equal to $\pi$ rad.

One of the plurality of first meta units may be configured such that the incident light undergoes localized Mie resonance.

At least one of the plurality of first meta units having a cylindrical shape may have a diameter less than a center wavelength of the wavelength band.

The metaoptic may further include a plurality of second meta units which are parallel to the first direction and connect the first meta units adjacent to each other, wherein the incident light may undergo guided mode resonance along the first meta units adjacent to each other and the plurality of second meta units parallel to the first direction.

According to yet another aspect of an example embodiment, there is provided a metaoptic for modulating incident light in a predetermined wavelength band, the metaoptic including a first semiconductor layer, an active layer provided on the first semiconductor layer, the active layer having a multiple quantum well structure and a refractive index variable based on a voltage applied thereto, and a plurality of second semiconductor layers provided on the active layer and doped with a polarity opposite to a polarity of the first semiconductor layer, the plurality of second semiconductor layers being periodically provided spaced apart from each other in a first direction and extending in a second direction perpendicular to the first direction, wherein a grating pattern is formed by a pattern in which the active layer and the plurality of second semiconductor layers repeat in the first direction.

The active layer may be configured such that the incident light undergoes Mie resonance, and the grating pattern in the first direction may be configured such that the incident light undergoes guided mode resonance.

In the wavelength band, the metaoptic may have a reflectance that is greater than or equal to 50%, and a maximum phase shift by the metaoptic based on wavelength variations may be greater than or equal to $\pi$ rad, or the metaoptic may have a reflectance that is greater than or equal to 50% or more in a refractive index variation region for light having a wavelength in the wavelength band, and a maximum phase shift by the metaoptic based on refractive index variations may be greater than or equal to $\pi$ rad.

BRIEF DESCRIPTION OF THE DRAWINGS

The above and/or other aspects, features, and advantages of example embodiments will be more apparent from the following description taken in conjunction with the accompanying drawings, in which:

FIG. 17 is a side view, and FIG. 18 is a plan view;

DETAILED DESCRIPTION

Figure 1:
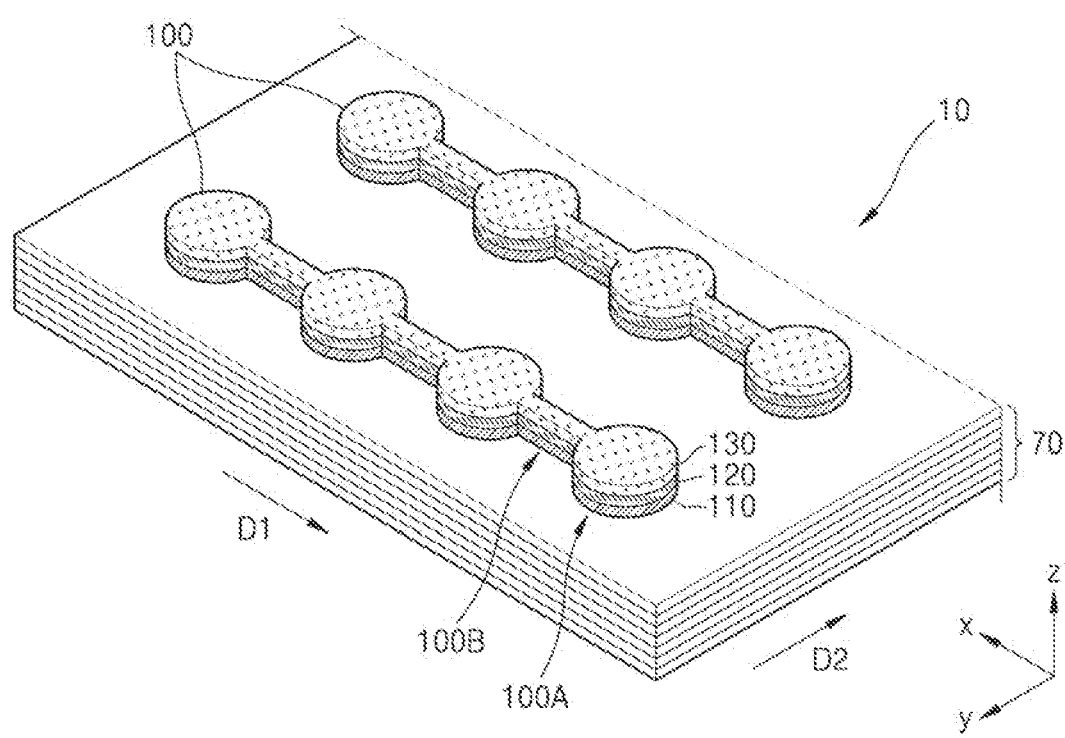
FIG. 1 is a perspective view illustrating the configuration of a metaoptic according to an example embodiment.

Reference will now be made in detail to embodiments, examples of which are illustrated in the accompanying drawings, wherein like reference numerals refer to like elements throughout. In this regard, the example embodiments may have different forms and should not be construed as being limited to the descriptions set forth herein. Accordingly, the example embodiments are merely described below, by referring to the figures, to explain aspects of the present description. As used herein, the term "and/or" includes any and all combinations of one or more of the associated listed items. Throughout the disclosure, the expression "at least one of a, b or c" indicates only a, only b, only c, both a and b, both a and c, both b and c, all of a, b, and c, or variations thereof.

Hereinafter, example embodiments will be described with reference to the accompanying drawings. The example embodiments described herein are for illustrative purposes only, and various modifications may be made therein. In the drawings, like reference numerals refer to like elements, and the sizes of elements may be exaggerated for clarity of illustration.

In the following description, when an element is referred to as being "above" or "on" another element, it may be directly on the other element while making contact with the other element or may be above the other element without making contact with the other element. Similarly, when an element is referred to as being "below" or "on" another element, it may be directly on the other element while making contact with the other element or may be below the other element without making contact with the other element.

The terms of a singular form may include plural forms unless otherwise mentioned. It will be further understood that the terms "comprises" and/or "comprising" used herein specify the presence of stated features or elements, but do not preclude the presence or addition of one or more other features or elements.

An element referred to with the definite article or a demonstrative determiner may be construed as the element or the elements even though it has a singular form.

The meaning of "connection" may include not only physical connection, but also optical connection, electrical connection, and the like.

In addition, examples or exemplary terms (for example, "such as" and "etc.") are used for the purpose of description and are not intended to limit the scope of the present disclosure unless defined by the claims.

It will be understood that although terms such as "first" and "second" are used herein to describe various elements, these elements should not be limited by these terms. These terms are only used to distinguish one element from other elements.

When one length such as a height, a depth, or a thickness is referred to being the same as another length, there may be a difference between the lengths within an error range acceptable by those of ordinary skill in the art.

The term "and/or" includes any and all combinations of one or more of the associated listed items. In addition, for example, the expression "at least one of A, B, or C" may indicate only A, only B, only B, both A and B, both A and C, both B and C, all of A, B, and C, or variations thereof.

A two-dimensional material may refer to a material in which atoms having a size of several nanometers are arranged in a single layer, that is, a crystalline material formed of a single layer of atoms.

The term "metaoptic" may refer to an optical device having a meta surface.

Figure 2A:
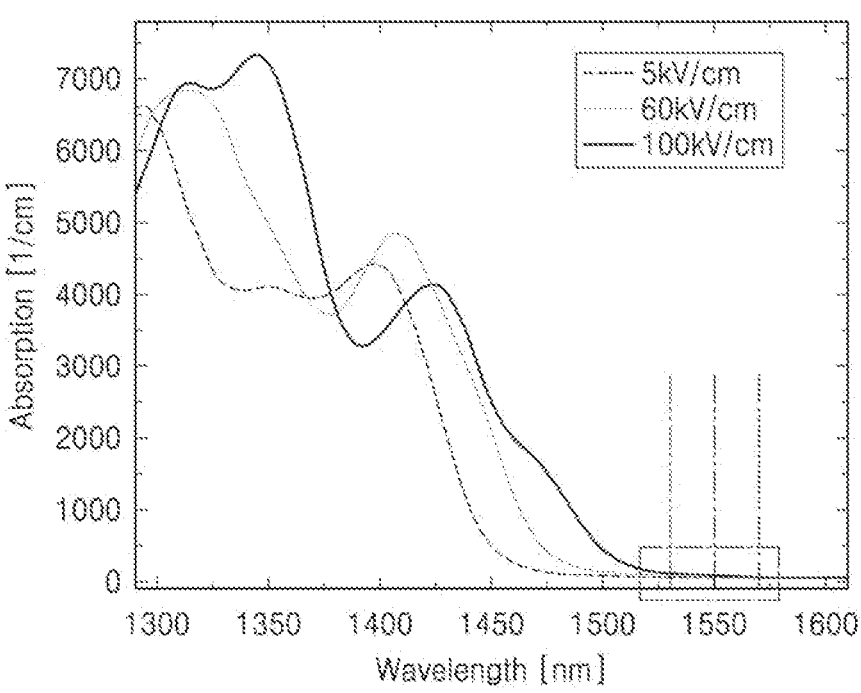
FIG. 2A is a graph illustrating the absorption coefficient of the metaoptic of the example embodiment with respect to wavelength when different electric fields are applied to an active layer of the metaoptic, the active layer having indium phosphide (InP) and a multiple quantum well structure.
Figure 2B:
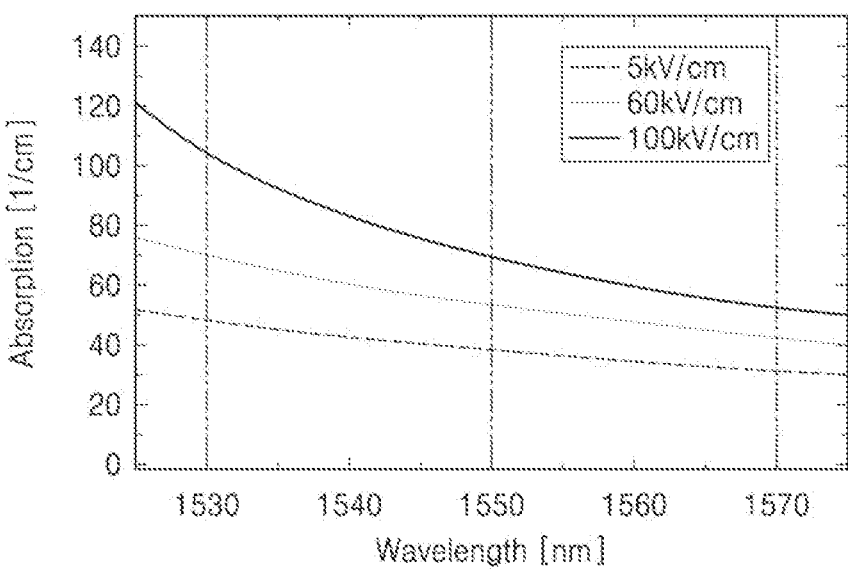
FIG. 2B is an enlarged graph illustrating a certain wavelength band in the graph shown in FIG. 2A.
Figure 3:
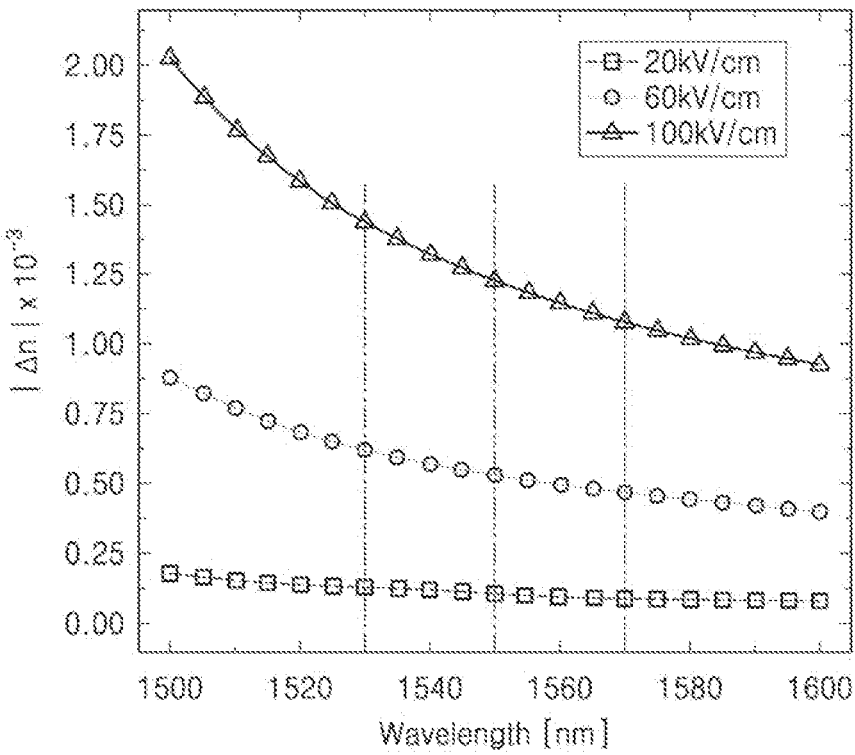
FIG. 3 is a graph illustrating variations in the refractive index of the metaoptic of the example embodiment with respect to wavelength when different electric fields are applied to the active layer having indium phosphide (InP) and a multiple quantum well structure.

FIG. 1 is a perspective view illustrating a configuration of a metaoptic 10 of an example embodiment. FIG. 2A is a graph illustrating the absorption coefficient of the metaoptic 10 of the example embodiment with respect to wavelength when different electric fields are applied to an active layer 120 of the metaoptic 10, the active layer 120 having indium phosphide (InP) and a multiple quantum well structure. FIG. 2B is an enlarged graph illustrating a certain wavelength band of the graph shown in FIG. 2A. FIG. 3 is a graph illustrating variations in the refractive index of the metaoptic 10 of the example embodiment with respect to wavelength when different electric fields are applied to the active layer 120 having indium phosphide (InP) and a multiple quantum well structure.

The metaoptic 10 of the example embodiment is provided to modulate incident light in a given wavelength band and may include a plurality of meta units 100 each including a first semiconductor layer 110, an active layer 120 having a multiple quantum well structure, the active layer 120 being arranged on the first semiconductor layer 110 and having a refractive index variable according to a voltage applied thereto, and a second semiconductor layer 130 arranged on the active layer 120 and doped to have a polarity opposite to the polarity of the first semiconductor layer 110. At least one of the meta units 100 may include a plurality of first elements 100A, which are periodically arranged spaced apart from each other in a first direction D1 and have a cylindrical shape, and a plurality of second elements 100B connecting the first elements 100A to each other. The meta units 100 may be arranged in a second direction D2 that is perpendicular to the first direction D1. In addition, the metaoptic 10 may include a distributed Bragg reflector (DBR) layer 70 under the meta units 100 and may have high reflectance in a given wavelength band. Guided mode resonance may occur in one of the meta units 100 in the first direction D1, and Mie resonance may occur in the first elements 100A of the one of the meta units 100, such that hybrid Mie-guided mode resonance in which two types of resonance are combined with each other may occur in the one of the meta units 100. Therefore, the metaoptic 10 of the example embodiment may have high reflectance and a large phase shift at a wavelength adjacent to a resonance wavelength in a predetermined wavelength band, thereby providing high modulation efficiency.

The metaoptic 10 of the example embodiment may include the meta units 100. The meta units 100 may each include the first semiconductor layer 110, the active layer 120, and the second semiconductor layer 130. The first semiconductor layer 110 and the second semiconductor layer 130 may include a Group III-V compound semiconductor material. For example, each of the first semiconductor layer 110 and the second semiconductor layer 130 may include at least one selected from the group consisting of gallium arsenide (GaAs), indium gallium arsenide (InGaAs), gallium nitride (GaN), aluminum gallium nitride (AlGaN), indium phosphide (InP), and gallium phosphide (GaP). The first semiconductor layer 110 and the second semiconductor layer 130 may provide electrons and holes. To this end, the first semiconductor layer 110 may be doped with a n-type or p-type dopant, and the second semiconductor layer 130 may be doped with a dopant of a type opposite the type of the first semiconductor layer 110. For example, the first semiconductor layer 110 may be doped with a p-type dopant, and the second semiconductor layer 130 may be doped with an n-type dopant. In another example, the first semiconductor layer 110 is doped with an n-type dopant, and the semiconductor layer 130 may be doped with a p-type dopant. When the first semiconductor layer 110 is doped with an n-type dopant, Sulfur (S) or Tin (Sn) may be used as the n-type dopant, and when the second semiconductor layer 130 is doped with a p-type dopant, zinc (Zn) may be used as the p-type dopant. In this case, the first semiconductor layer 110 doped with an n-type dopant may provide electrons to the active layer 120, and the second semiconductor layer 130 doped with a p-type dopant may provide holes to the active layer 120.

The active layer 120 may have a multiple quantum well structure in which multiple quantum wells are arranged. The metaoptic 10 may further include a voltage applying unit to apply a voltage to the active layer 120. For example, a given voltage may be applied between the first semiconductor layer 110 and the second semiconductor layer 130, and then an electric field may be formed in the active layer 120. Optical characteristics of the active layer 120, such as a refractive index, may be changed by the electric field formed in the active layer 120. The degree of modulation of incident light may vary with variations in the refractive index of the active layer 120. For example, the reflectance of the meta units 100 and the reflection phase shift by the meta units 100 may vary with variations in the refractive index of the active layer 120.

The active layer 120 may include a material having a low absorption coefficient with respect to light to be modulated in a predetermined wavelength band. In addition, the active layer 120 may include a material of which the refractive index and/or the phase shifting ability vary according to the magnitude of an electric field applied to the active layer 120. In addition, the active layer 120 may include a material having an appropriate refractive index variation range according to an electric field applied thereto. The active layer 120 may include a Group III-V compound semiconductor material. For example, the active layer 120 may have a multiple quantum well structure based on GaAs, InGaAs, GaN, AlGaN, InP, InGaAsP or GaP.

Referring to FIGS. 2A and 2B, the active layer 120 of the metaoptic 10 of the example embodiment may have a multiple quantum well structure including InP. The multiple quantum well structure including InP may have a sufficiently low absorption coefficient in a wavelength band of about 1520 nm to about 1580 nm. For example, when an electric field of about 5 kV/cm is applied to the active layer 120, an absorption coefficient in the wavelength band may be lower than about 100 $cm^{-1}$ or about 50 $cm^{-1}$. For example, when an electric field of about 60 kV/cm is applied to the active layer 120, an absorption coefficient in the wavelength band may be lower than about 160 $cm^{-1}$ or about 80 $cm^{-1}$. For example, when an electric field of about 100 kV/cm is applied to the active layer 120, an absorption coefficient in the wavelength band may be lower than about 240 $cm^{-1}$ or about 120 $cm^{-1}$. For example, when an electric field of about 100 kV/cm is applied to the active layer 120, an absorption coefficient is sufficiently low, and thus even when a voltage of about 0 kV/cm to about 100 kV/cm is applied to the active layer 120, the amount of light absorbed by the active layer 120 in the wavelength band may be small, such that the metaoptic 10 having a multiple quantum well structure including InP may have high light modulation efficiency.

Referring to FIG. 3, when the metaoptic 10 of the example embodiment has a multiple quantum well structure including InP, the refractive index of the metaoptic 10 may vary according to a voltage applied to the active layer 120. For example, when an electric field of about 20 kV/cm is applied to the active layer 120, a refractive index variation with respect to light having a wavelength of about 1530 nm may be about 0.0001 to about 0.00025. For example, when an electric field of about 60 kV/cm is applied to the active layer 120, a refractive index variation with respect to light having a wavelength of about 1530 nm may be about 0.0005 to about 0.0007. For example, when an electric field of about 100 kV/cm is applied to the active layer 120, a refractive index variation with respect to light having a wavelength of about 1530 nm may be about 0.0014 to about 0.0016. Refractive index variations may be sufficiently large with respect to light in a wavelength band of about 1520 nm to about 1580 nm, and thus the metaoptic 10 having a multiple quantum well structure including InP may have high light modulation efficiency.

At least one of the meta units 100 included in the metaoptic 10 of the example embodiment may include the first elements 100A, which are periodically arranged spaced apart from each other in the first direction D1 and have a cylindrical shape, and the second elements 100B connecting the first elements 100A to each other. The meta units 100 may be arranged in the second direction D2 that is perpendicular to the first direction D1. The period of the first elements 100A may be less than the wavelength of incident light, and the period of the meta units 100 may be less than the wavelength of incident light. With respect to light incident in a predetermined wavelength band, the period of the first elements 100A may be less than the center wavelength of the predetermined wavelength band, and the period of the meta units 100 may be less than the center wavelength of the predetermined wavelength band. However, the interval between the first elements 100A or the interval between the meta units 100 is not limited to the constant period described above. For example, the first elements 100A or the meta units 100 may be arranged with alternating first and second periods or with different periods.

In addition, the diameter of at least one of the first elements 100A may be less than the wavelength of incident light. For example, the diameter of at least one of the first elements 100A may be less than ½ of the wavelength of incident light. The first elements 100A may have the same diameter, but embodiments are not limited thereto. For example, the first elements 100A may have different diameters or may have a first diameter and a second diameter, which are different from each other and alternate in the first direction D1. For incident light having a predetermined wavelength band, the diameter of at least one of the first elements 100A may be less than the center wavelength of the predetermined wavelength band, for example, less than ½ of the center wavelength of the predetermined wavelength band.

The thickness of at least one of the first elements 100A may be less than the wavelength of incident light. The first elements 100A may have the same thickness, but embodiments are not limited thereto. For example, the first elements 100A may have different thicknesses or may have a first thickness and a second thickness, which are different from each other and alternate in the first direction D1. For incident light having a predetermined wavelength band, the thickness of at least one of the first elements 100A may be less than the center wavelength of the predetermined wavelength band.

According to the example embodiment, the second elements 100B may connect the first elements 100A adjacent to each other in the first direction D1, and thus the meta units 100 may extend in the first direction D1. For example, at least one of the second elements 100B may have a rectangular cross-section when viewed in a yz plane. However, embodiments are not limited thereto. One of the second elements 100B may have substantially the same thickness as first elements 100A (that is, adjacent first elements 100A), which are connected to each other through the one of the second elements 100B. For example, when the first elements 100A have substantially the same thickness, the second elements 100B may also have substantially the same thickness as the thickness of the first elements 100A.

Mie resonance may occur in each of the first elements 100A having a cylindrical shape. In addition, guided mode resonance may occur in the first elements 100A having a cylindrical shape and the second elements 100B connecting the first elements 100A to each other in the first direction D1. At least one of the meta units 100 includes the first elements 100A and the second elements 100B connecting the first elements 100A to each other in the first direction D1, and may thus be referred to as extending in the first direction D1, and guided mode resonance of light may occur in one meta unit 100 in the first direction D1. In addition, each of the meta units 100 may include the first elements 100A and the second elements 100B, and hybrid Mie guided mode resonance of light may occur in the meta units 100. Due to hybrid Mie-guided mode resonance, high reflectance may be maintained against refractive index variations, and a large phase shift may be obtained according to refractive index variations.

The metaoptic 10 of the example embodiment may include the DBR layer 70 arranged under the meta units 100. The DBR layer 70 may have a multilayer structure in which two layers having different refractive indexes are repeated. The thickness of one layer included in the DBR layer 70 may be (2m+1)/4 of the wavelength of incident light (where m refers to an integer greater than or equal to 0). However, the thickness of the one layer included in the DBR layer 70 may be varied according to the direction of incident light. Due to the reflection and refraction characteristics of the DBR layer 70, the DBR layer 70 may have low transmittance and high reflectance with respect to incident light.

The wavelength band of light incident on the metaoptic 10 of the example embodiment may include a visible wavelength band and an infrared wavelength band, for example, a wavelength band of about 300 nm to about 1 mm. Light may be vertically incident on the meta units 100 of the metaoptic 10. Referring to FIG. 1, light may be vertically incident on the metaoptic 10 in a −z direction. In addition, incident light may be polarized in one direction. For example, incident light may be polarized in the second direction D2. However, embodiments are not limited thereto, and light may be incident on the metaoptic 10 at a predetermined angle with respect to one direction.

Figure 4:
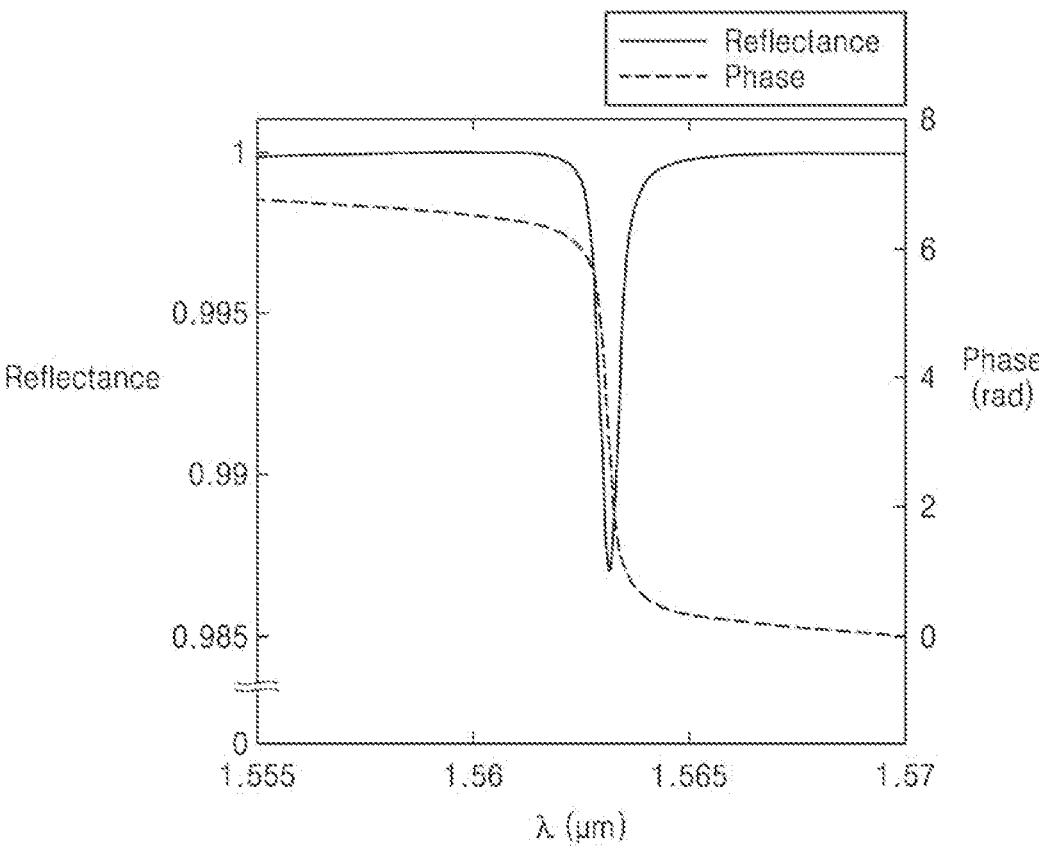
FIG. 4 is a graph illustrating the reflectance and the phase shifting ability of the metaoptic of the example embodiment in a given wavelength band.
Figure 5:
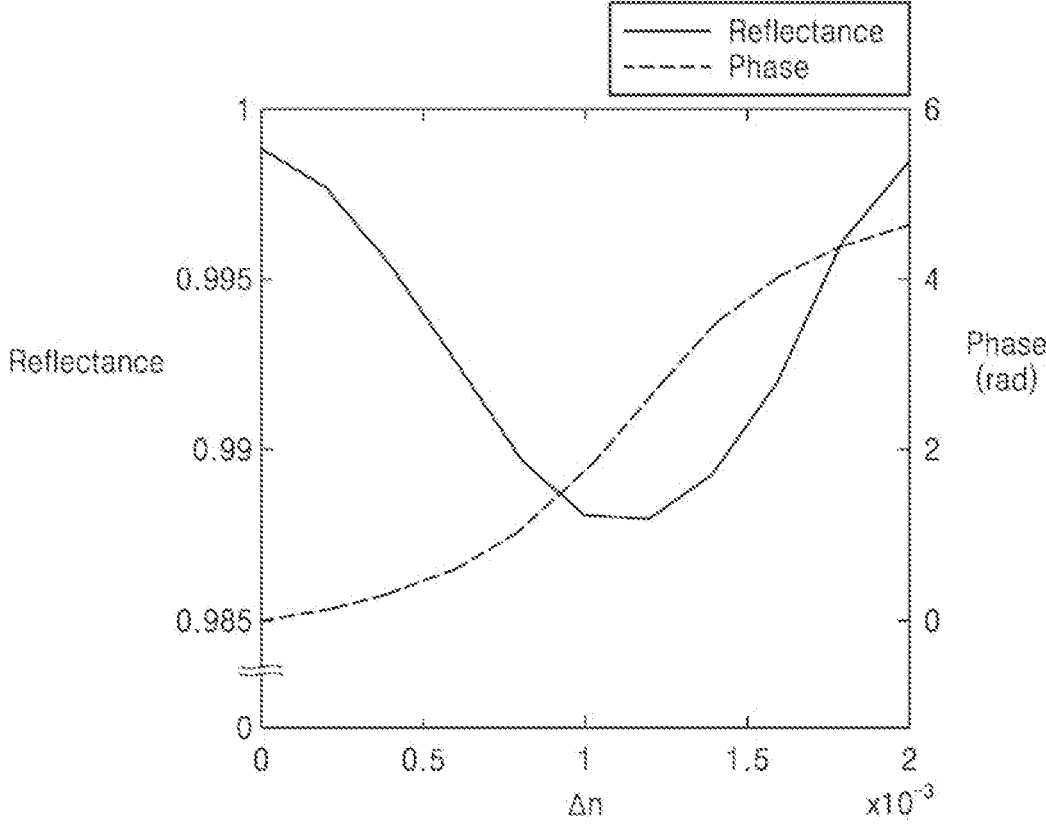
FIG. 5 is a graph illustrating the reflectance and the phase shifting ability of the metaoptic of the example embodiment with respect to refractive index variations at a wavelength of about 1563 nm.

FIG. 4 is a graph illustrating the reflectance and the phase shifting ability of the metaoptic 10 of the example embodiment in a given wavelength band, and FIG. 5 is a graph illustrating the reflectance and the phase shifting ability of the metaoptic 10 of the example embodiment with respect to refractive index variations at a wavelength of about 1563 nm.

The first elements 100A of the metaoptic 10 of the example embodiment may be arranged with a period of about 1.4 μm in the first direction D1, and the meta units 100 may be arranged with a period of about 700 nm. In addition, the first elements 100A may have a cylindrical shape having a radius of about 255 nm and a thickness of about 1000 nm. In each of the first elements 100A, the first semiconductor layer 110, which is lowermost, may include InP doped with an n-type dopant, the active layer 120 may have a multiple quantum well structure including InP, and the second semiconductor layer 130 may include InP doped with a p-type dopant. The second elements 100B of the metaoptic 10 of the example embodiment may have a rectangular cross-section having a transverse length (or y-direction length) of about 200 nm and a thickness of about 1000 nm. Furthermore, in each of the second elements 100B, the first semiconductor layer 110, which is lowermost, may include InP doped with an n-type dopant, the active layer 120 may have a multiple quantum well structure including InP, and the second semiconductor layer 130 may include InP doped with a p-type dopant. The height of the interface between the first semiconductor layer 110 and the active layer 120 may be uniform in the first elements 100A and the second elements 100B, and the height of the interface between the active layer 120 and the second semiconductor layer 130 may be uniform in the first elements 100A and the second elements 100B. In addition, the DBR layer 70 arranged under the meta units 100 may have a multilayer structure in which silicon dioxide ($SiO_2$) and silicon nitride ($Si_3N_4$) are repeated. For example, the DBR layer 70 including $SiO_2$ and $Si_3N_4$ may have fifteen layers.

In the example embodiment shown in FIG. 4, light may be vertically incident on the metaoptic 10 in the −z direction, and the polarization direction of the incident light may be the second direction D2 (y direction).

Referring to FIG. 4, reflectance may vary at the center wavelength in a wavelength band of about 1550 nm to about 1580 nm, for example, at a wavelength of about 1560 nm to about 1565 nm, and a reflectance dip may occur around a resonance wavelength of about 1563 nm. Although a reflectance dip occurs around the resonance wavelength, the reflectance dip (reflectance variation) may be relatively small. For example, the reflectance at the resonance wavelength may be greater than about 95%, and in the example above, the reflectance at the resonance wavelength may be greater than about 98.5%. However, because of the reflectance dip locally occurring around the resonance wavelength of about 1563 nm, a quality factor (Q-factor) may be greater than about 700, and the Q-factor may be about 1400 in the example above. The reflectance and the Q factor at the resonance wavelength are merely non-limiting examples.

Referring to FIG. 4, reflectance may be about 95% or more in a wavelength band of about 1560 nm to about 1565 nm. In the example above, reflectance may be about 98% or more in the wavelength band.

In a general reflective resonance structure using a DBR layer or a metal substrate, a reflectance dip occurs, and when guided mode resonance of light occurs in the first direction D1 in the metaoptic 10 of the example embodiment, a reflectance peak may also occur at a resonance wavelength. Therefore, in the metaoptic 10 of the example embodiment, a reflectance decrease caused by a reflectance dip at a resonance wavelength may be relatively small, and thus the metaoptic 10 may have a relatively high reflectance and high modulation efficiency even at a wavelength close to a resonance wavelength.

In addition, the maximum reflection phase shift of light in a wavelength band of about 1560 nm to about 1565 nm may be about $1.7\pi$ rad (or about 306°). Thus, the metaoptic 10 according to the example embodiment may be operated in an over-coupling regime in which the maximum reflection phase shift of light may be about $\pi$ rad (or 180°) or more.

The metaoptic 10 of the example embodiment has a relatively high reflectance on the level of about 95% or more in a predetermined wavelength band, and the maximum reflection phase shift according to variations in wavelength is as high as about $1.7\pi$ rad, such that the metaoptic 10 may have high light modulation efficiency.

Referring to FIG. 5, the refractive index of the metaoptic 10 may vary at a wavelength about 1563 nm according to a voltage applied from the voltage applying unit to the metaoptic 10 (or an electric field applied to the active layer 120). The reflectance of the metaoptic 10 may be greater than or equal to about 95% while the refractive index of the metaoptic 10 varies. In the above example, the reflectance of the metaoptic 10 may be about 98% or more while the refractive index of the metaoptic 10 varies from 0 to about 0.002, such that the metaoptic 10 may have a relatively high modulation efficiency. In addition, the maximum reflection phase shift of light may be $\pi$ rad or more while the refractive index of the metaoptic 10 varies. In the above example, while the refractive index of the metaoptic 10 varies from 0 to about 0.002, the maximum reflection phase shift of light may be about $1.53\pi$ rad (or about 275°).

In a refractive index variation region in which the refractive index of the metaoptic 10 of the example embodiment varies (according to a voltage applied thereto), the metaoptic 10 may have a relatively high reflectance on the level of about 95% or more, and the maximum reflection phase shift of light is as high as about $1.53\pi$ rad, such that the metaoptic 10 may modulate light with a relatively high efficiency.

As described above, the metaoptic 10 of the example embodiment, which is configured to modulate light in a predetermined wavelength band, may have a relatively high reflectance on the level of about 90% or more in the predetermined wavelength band and may have a large maximum reflection phase shift on the level of about $\pi$ rad in the predetermined wavelength band, such that the metaoptic 10 may have a relatively high light modulation efficiency. In addition, the refractive index of the metaoptic 10 of the example embodiment may vary with respect to a wavelength in a predetermined wavelength band when a voltage is applied to the metaoptic 10. In this case, the metaoptic 10 may have a relatively high reflectance on the level of about 90% or more in a refractive index variation region and may have a relatively large reflection phase shift on the level of $\pi$ rad or more according to refractive index variations, thereby providing a relatively high light modulation efficiency. In addition, the metaoptic 10 of the example embodiment may have a relatively high Q factor on the level of about 1000 or more at a resonance wavelength.

Figure 6:
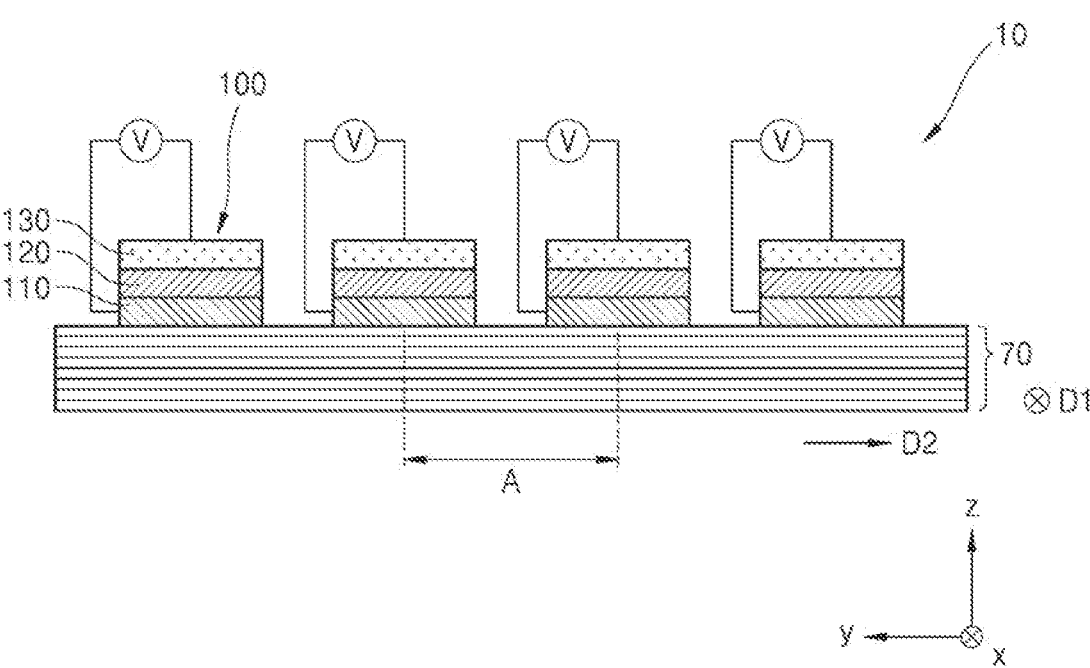
FIG. 6 is a cross-sectional view schematically illustrating a configuration of voltage applying units configured to apply voltage to a metaoptic according to an example embodiment.
Figure 7:
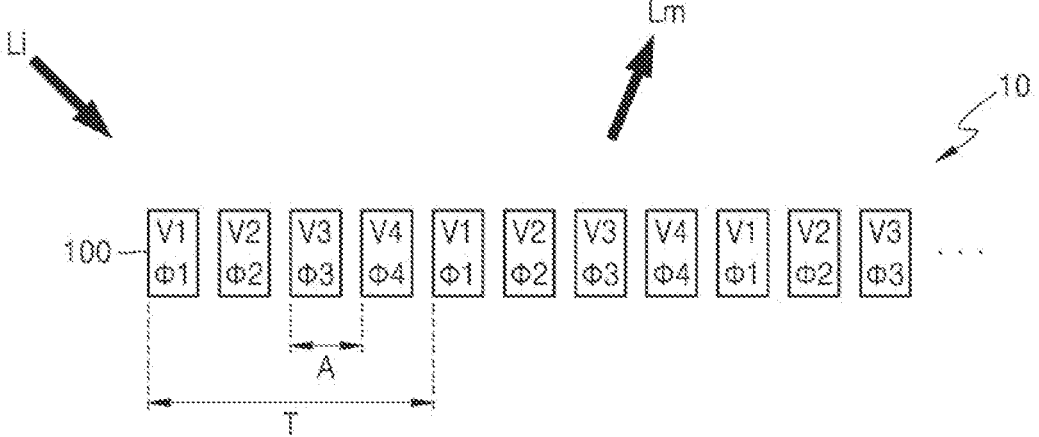
FIG. 7 is a conceptual view illustrating a direction in which light is steered according to voltage applied to the metaoptic of the example embodiment.

FIG. 6 is a cross-sectional view schematically illustrating a configuration of voltage applying units configured to apply voltage to a metaoptic 10 according to an example embodiment. FIG. 7 is a conceptual view illustrating a direction in which light is steered according to voltage applied to the metaoptic 10 of the example embodiment.

The metaoptic 10 of the example embodiment may have a structure in which a plurality of meta units 100 are arranged in a second direction D2. Each of the meta units 100 may include a first semiconductor layer 110, an active layer 120, and a second semiconductor layer 130, which are arranged in the thickness direction of the meta unit 100, and the meta units 100 may be periodically arranged on a DBR layer 70 in the second direction D2. The voltage applying units connected to each other may independently apply voltages to the meta units 100 to independently apply electric fields to the active layers 120 of the meta units 100. Phase modulation of light incident on the meta units 100 may be individually controlled.

The metaoptic 10 may include the meta units 100 in which modulation of incident light may be independently controlled, and thus, the metaoptic 10 may be implemented as optical devices having various functions. For example, the metaoptic 10 may be implemented as a beam deflector configured to deflect light, a beam steerer configured to control a light deflection direction, a beam shaper configured to change the pattern of incident light to an intended pattern, or an optical device having a function such as a lens function for converging or diverging light.

Referring to FIG. 7, voltages may be independently applied to the meta units 100 of the metaoptic 10 of the example embodiment, and thus the meta units 100 may independently modulate incident light Li. Output light Lm may be modulated in various directions by varying a modulation period T of the meta units 100. Therefore, a light deflection angle may be expressed by Equation 1 below.

$$\theta = \sin^{-1}\lambda/T \qquad \text{Equation 1}$$

Here, T refers to a modulation period, and A refers to the wavelength of incident light Li.

The number of meta units 100 included in each modulation period T may be set by considering the arrangement interval A between adjacent meta units 100, a phase modulation value in each meta unit 100, and an intended light deflection angle $\theta$.

Referring to FIG. 7, voltages may be applied the meta units 100 arranged with a period of four meta units 100. For example, when voltages V1, V2, V3, and V4 are respectively applied to four meta units 100, phase shifts $\varphi1$, $\varphi2$, $\varphi3$, and $\varphi4$ by the four meta units 100 may respectively be 0 rad, $\pi/2$ rad, $\pi$ rad, $3\pi/2$ rad. However, embodiments are not limited thereto. For example, the phase shifts $\varphi1$, $\varphi2$, $\varphi3$, and $\varphi4$ may have monotonically increasing values that are different from the values listed above or may have monotonically decreasing values. The values may have regular intervals, but are not limited thereto. For example, the values may have irregular intervals.

In addition, voltages may be applied to the meta units 100 with a modulation period T of three meta units 100. That is, voltages V1', V2', and V3' may be respectively applied to three meta units 100, and then phase shifts $\varphi1'$, $\varphi2'$, and $\varphi3'$ by the three meta units 100 may respectively be 0 rad, $2\pi/3$ rad, and $4\pi/3$ rad.

The metaoptic 10 of the example embodiment may further include a processor configured to perform control to independently apply voltages to the meta units 100 to deflect incident light Li at a given angle. The processor may vary application voltages in a time sequential manner to vary the deflection angle of light in a time sequential manner, and thus a given region may be scanned.

Figure 8:
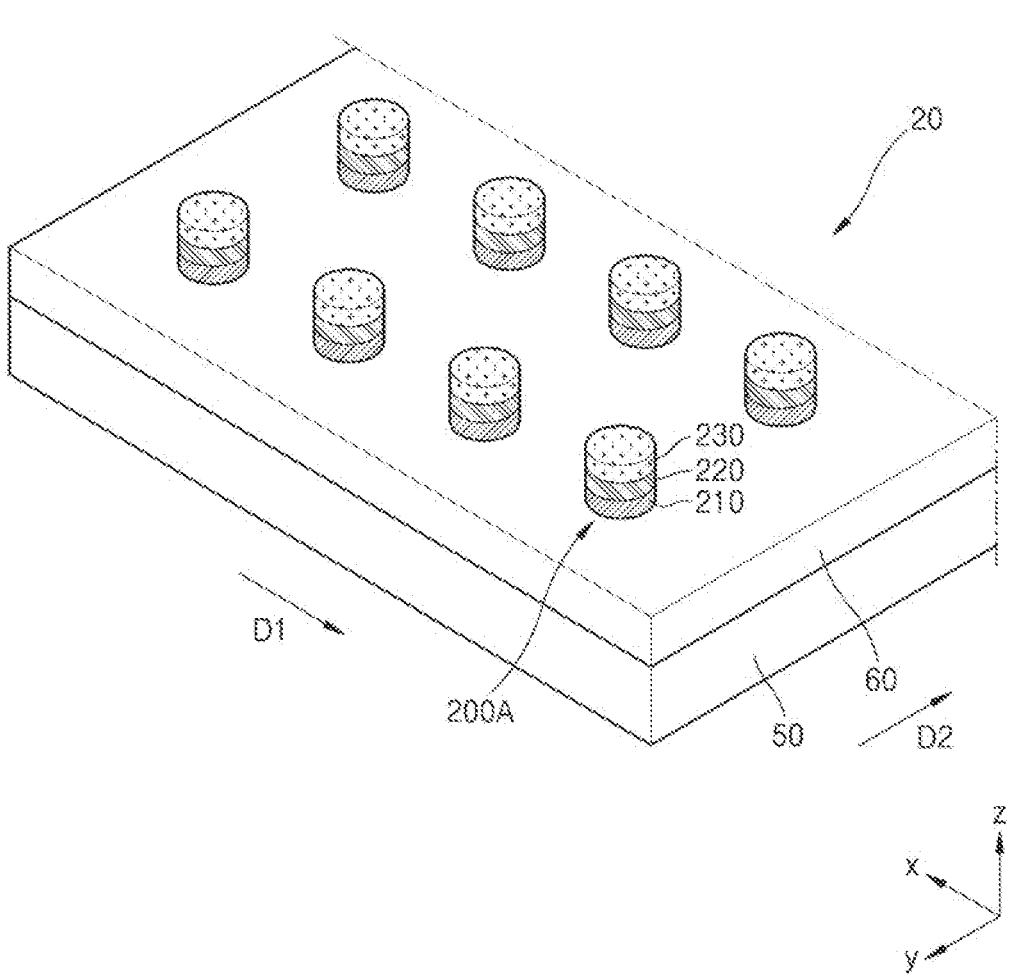
FIG. 8 is a perspective view illustrating a configuration of a metaoptic according to an example embodiment.

FIG. 8 is a perspective view illustrating a configuration of a metaoptic 20 according to an example embodiment.

The metaoptic 20 of the example embodiment may include a dielectric layer 60, and a plurality of first meta units 200A having a cylindrical shape, the first meta units 200A being periodically arranged on the dielectric layer 60 and spaced apart from each other in a first direction D1 and a second direction D2 perpendicular to the first direction D1. Each of the first meta units 200A may include a first semiconductor layer 210, an active layer 220 arranged on the first semiconductor layer 210 and having a refractive index variable according to a voltage applied thereto, the active layer 220 having a multiple quantum well structure, and a second semiconductor layer 230 arranged on the active layer 220 and doped to have a polarity opposite to the polarity of the first semiconductor layer 210. Voltage may be independently applied to the first meta units 200A. In addition, localized Mie resonance of light may occur in the first meta units 200A. Therefore, the metaoptic 20 of the example embodiment may have a large reflectance difference and a large phase shift at a wavelength adjacent to a resonance wavelength in a predetermined wavelength band, thereby providing a relatively high modulation efficiency.

The metaoptic 20 of the example embodiment may further include the dielectric layer 60. Each of the first meta units 200A may be electrically insulated from each other owing to the dielectric layer 60. For example, the dielectric layer 60 may include silicon dioxide ($SiO_2$). However, the dielectric layer 60 is not limited thereto and may include other dielectric materials. For example, a material selected by considering the refractive index and/or the dielectric constant of the material may be included in the dielectric layer 60.

The metaoptic 20 of the example embodiment may further include a substrate 50 under the dielectric layer 60. For example, the substrate 50 may include a semiconductor material such as silicon (Si). However, the substrate 50 is not limited thereto. In another example, the substrate 50 may include another material.

Each of the first meta units 200A of the metaoptic 20 of the example embodiment may include the first semiconductor layer 210, the active layer 220, and the second semiconductor layer 230. Descriptions thereof are the same as those given above and thus are omitted.

The first meta units 200A of the metaoptic 20 of the example embodiment may each have a cylindrical shape. Light incident on the metaoptic 20 may undergo localized Mie resonance in each of the first meta units 200A.

The first meta units 200A included in the metaoptic 20 of the example embodiment may be periodically arranged in the first direction D1 and the second direction D2 perpendicular to the first direction D1. The arrangement intervals between the first meta units 200A may be the same in the first and second directions D1 and D2 or may be different from each other in the first and second directions D1 and D2. The first meta units 200A may be arranged at regular intervals in the first direction D1, but embodiments are not limited thereto. For example, the first meta units 200A may be variously arranged in the first direction D1, for example, with alternating periods. This may also apply to the arrangement of the first meta units 200A in the second direction D2.

The first meta units 200A may be two-dimensionally arranged in the first and second directions D1 and D2, which are perpendicular to each other, and thus the metaoptic 20 of the example embodiment may two-dimensionally steer light. For example, the metaoptic 20 may steer light in the first direction D1 and/or the second direction D2. In particular, rather than having a shape extending on a plane in the first direction D1 and the second direction D2, the first meta units 200A have a length in the first direction D1 and a length in the second direction D2, which are less than the wavelength of incident light, thereby making it easier to two-dimensionally arrange the first meta units 200A and two-dimensionally steer light with the first meta units 200A.

The period of the first meta units 200A arranged in the first direction D1 may be less than the wavelength of incident light, and the period of the first meta units 200A arranged in the second direction D2 may be less than the wavelength of incident light. For incident light having a predetermined wavelength band, the period of the first meta units 200A in the first direction D1 may be less than the center wavelength of the predetermined wavelength band, and/or the period of the first meta units 200A in the second direction D2 may be less than the center wavelength of the predetermined wavelength band.

In addition, the diameter of at least one of the first meta units 200A having a cylindrical shape may be less than the wavelength of incident light, for example, less than ½ of the wavelength of incident light. The first meta units 200A may have the same diameter, but embodiments are not limited thereto. For example, the first meta units 200A may have different diameters or may have first and second diameters that are different from each other and alternate in the first direction D1. For incident light having a predetermined wavelength band, the diameter of at least one of the first meta units 200A may be less than the center wavelength of the predetermined wavelength band, for example, less than ½ of the center wavelength of the predetermined wavelength band.

The thickness of at least one of the first meta units 200A may be less than the wavelength of the incident light. The first meta units 200A may have the same thickness, but are not limited thereto. For example, the first meta units 200A may have different thicknesses or may have first and second thicknesses that are different from each other and alternate in the first direction D1. For incident light having a predetermined wavelength band, the thickness of at least one of the first meta units 200A may be less than the center wavelength of the predetermined wavelength band.

Figure 9:
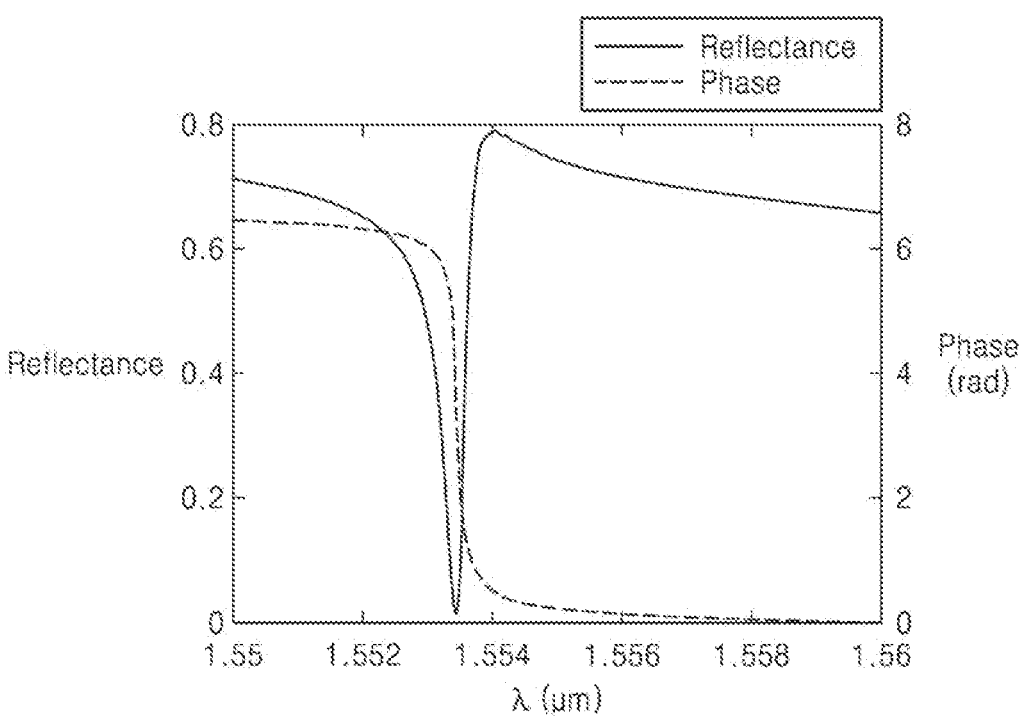
FIG. 9 is a graph illustrating the reflectance and the phase shifting ability of the metaoptic of the example embodiment with respect to wavelength in a given wavelength band.
Figure 10:
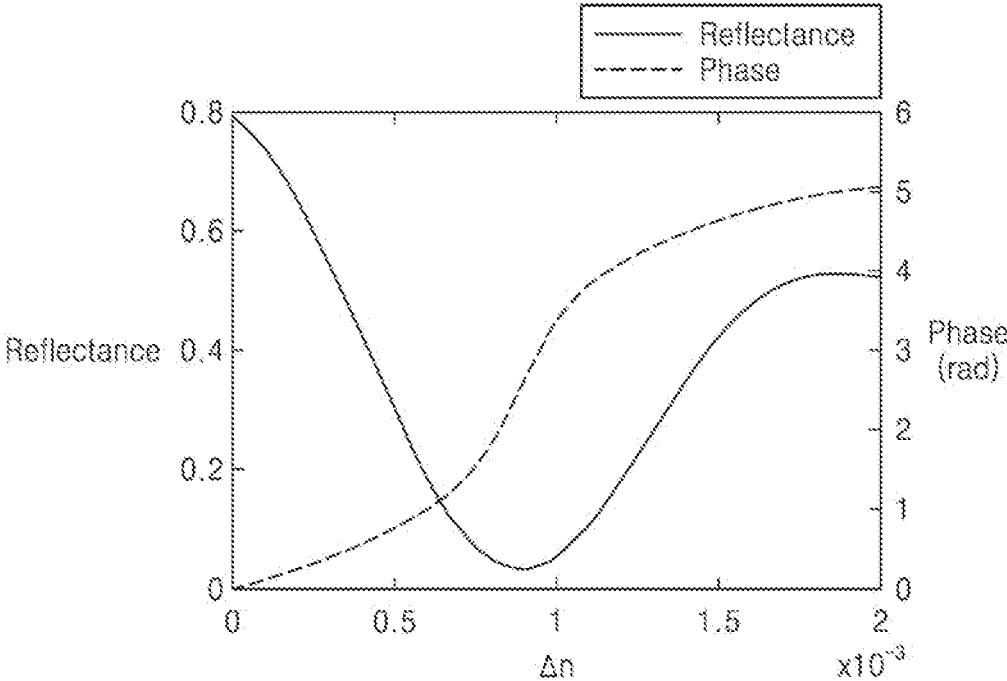
FIG. 10 is a graph illustrating the reflectance and the phase shifting ability of the metaoptic of the example embodiment with respect to refractive index variations (electric field variations) at a wavelength of about 1553 nm.

FIG. 9 is a graph illustrating the reflectance and the phase shifting ability of the metaoptic 20 of the example embodiment with respect to wavelength in a given wavelength band, and FIG. 10 is a graph illustrating the reflectance and the phase shifting ability of the metaoptic 20 of the example embodiment with respect to refractive index variations (electric field variations) at a wavelength of about 1553 nm.

The metaoptic 20 of the example embodiment may include the substrate 50 including Si, the dielectric layer 60 including $SiO_2$ on the substrate 50, and the first meta units 200A two-dimensionally arranged on the dielectric layer 60. The first meta units 200A may be arranged with a period of about 800 nm in the first direction D1 and may be arranged with a period of about 800 nm in the second direction D2. In addition, the first meta units 200A having a cylindrical shape may have a radius of about 290 nm and a thickness of about 650 nm. In each of the first meta units 200A, the first semiconductor layer 210, which is lowermost, may include InP doped with an n-type dopant, the active layer 220 may have a multiple quantum well structure including InP, and the second semiconductor layer 230 may include InP doped with a p-type dopant.

The wavelength band of light incident on the metaoptic 20 of the example embodiment may include a visible wavelength band and an infrared wavelength band, for example, a wavelength band of about 300 nm to about 1 mm. Light may be vertically incident on the first meta units 200A of the metaoptic 20. Referring to FIG. 8, light may be vertically incident on the metaoptic 20 in a −z direction. In addition, incident light may be polarized in one direction. For example, incident light may be polarized in the second direction D2. However, embodiments are not limited thereto, and light may be incident on the metaoptic 20 at a predetermined angle with respect to one direction.

Referring to FIG. 9, reflectance may vary at the center wavelength of a wavelength band of about 1540 nm to about 1560 nm, for example, at a wavelength of about 1550 nm to about 1556 nm, and a reflectance dip may occur around a resonance wavelength of about 1553 nm. Due to the reflectance dip around the resonance wavelength, reflectance may be about 5% or more for a wavelength of about 1553 nm. Reflectance may be about 60% or more at a wavelength of about 1552 nm and may be about 60% or more at a wavelength of about 1555 nm. For the reflectance dip around the resonance wavelength of about 1553 nm, the Q-factor of the metaoptic 20 may be greater than about 500, but is not limited thereto.

In addition, the maximum reflection phase shift of light in a wavelength band of about 1552 nm to about 1556 nm may be about $2\pi$ rad (or about 360 which shows that the metaoptic 20 of the example embodiment may be operated in an over-coupling regime in which the maximum reflection phase shift of light may be greater than or equal to $\pi$ rad (or 180°).

The metaoptic 20 of the example embodiment may have a relatively high light modulation efficiency because the maximum reflection phase shift by the metaoptic 20 is about $2\pi$ rad, that is, a phase shift by the metaoptic 20 may range from about 0 rad to about $2\pi$ rad.

Referring to FIG. 10, the refractive index of the metaoptic 20 may vary at a wavelength of about 1553 nm according to a voltage applied by a voltage applying unit (or an electric field applied to the active layer 220). The reflectance of the metaoptic 20 may have a minimum value of about 5% or greater in a refractive index variation region in which the refractive index of the metaoptic 20 varies from about 0 to about 0.002. In this case, the metaoptic 20 may have a reflectance of about 20% or more with respect to a refractive index variation of about 0.0005 and a reflectance of about 20% or more with respect to a refractive index variation of about 0.0015. In addition, while the refractive index of the metaoptic 20 varies from about 0 to about 0.002, the maximum reflection phase shift of light may be about $1.6\pi$ (or about 288°).

The maximum phase shift by the metaoptic 20 of the example embodiment is as high as about $1.6\pi$ rad with respect to refractive index variations (or with respect to an applied voltage), thereby providing a relatively high light modulation efficiency.

The metaoptic 20 of the example embodiment including the first meta units 200A may further include a plurality of second meta units that are parallel to each other in the first direction D1 and connect together the first meta units 200A adjacent to each other. For example, the first meta units 200A may be arranged in N rows (where N refers to an integer greater than or equal to 1) in the first direction D1 and M columns (where M refers to an integer greater than or equal to 1) in the second direction D2. For example, the first meta units 200A may have an N*M arrangement. First meta units 200A included in a first row of the N rows may be parallel to the first direction D1 and may extend in the first direction D1 in a state in which the first meta units 200A are connected to each other through a plurality of second meta units in the first direction D1. For example, when the number of first meta units 200A included in the first row is M, the number of second meta units may be M−1. However, embodiments are not limited thereto, and second meta units may not be arranged between adjacent first meta units 200A. For example, when the first meta units 200A included in the first row are grouped into two sets, the number of second meta units may be M−2, and when the first meta units 200A are grouped into three sets, the number of second meta units may be M−3. In the example described above, first meta units 200A arranged parallel to the first direction D1 are connected through a plurality of second meta units. However, embodiments are not limited thereto, and first meta unit 200A arranged parallel to the second direction D2 may be connected through a plurality of second meta units.

Light incident on the metaoptic 20 may resonate in a guided mode in the first direction D1. For example, when all of first meta units 200A included in a first column are connected through a plurality of second meta units, light may resonate in a guided mode along the first meta units 200A and the second meta units included in the first column. In this case, the first meta units 200A and the second meta units included in the first column may form one meta unit. However, embodiments are not limited thereto, and only some of the first meta units 200A included in the first column may be connected to each other, and in this case, light may resonate in a guided mode along first meta units 200A and second meta units connected to each other. When the first meta units 200A included in the first column are grouped into a plurality of sets as described above, light may be steered in the first direction D1 and the second direction D2.

Figure 11:
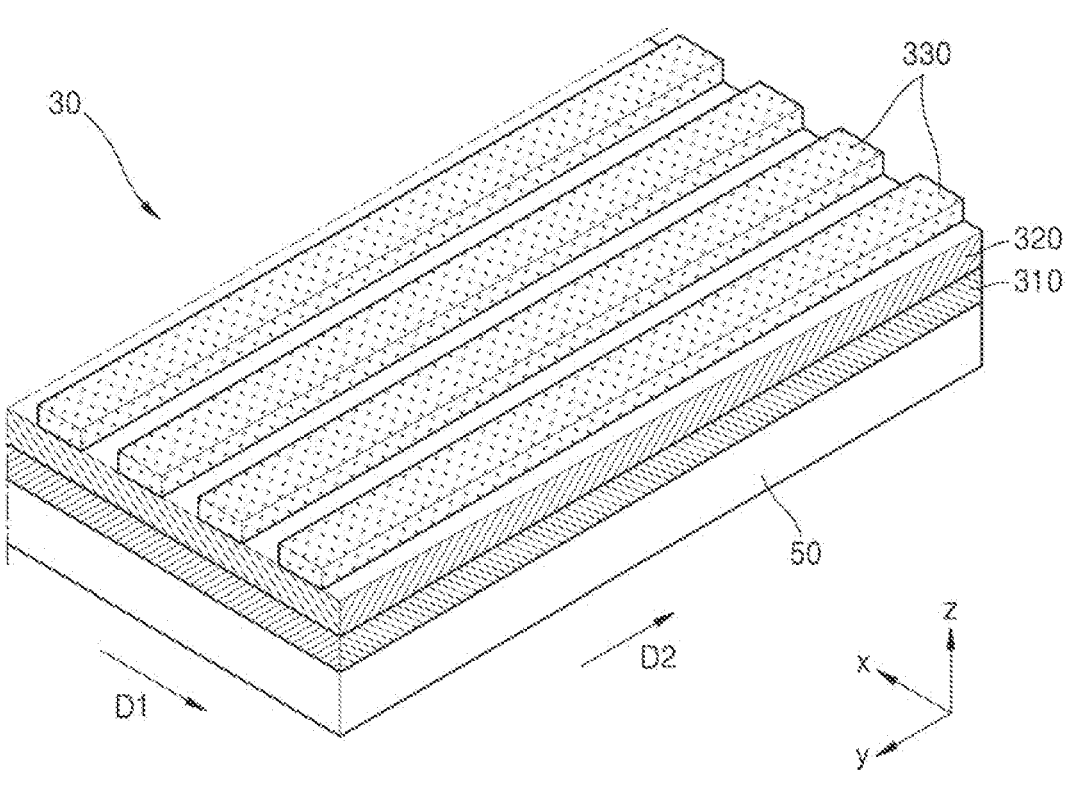
FIG. 11 is a perspective view illustrating a configuration of a metaoptic according to an example embodiment.

FIG. 11 is a perspective view illustrating a configuration of a metaoptic 30 according to an example embodiment.

The metaoptic 30 of the example embodiment may include a first semiconductor layer 310; an active layer 320 arranged on the first semiconductor layer 310 and having a refractive index variable according to a voltage applied thereto, the active layer 320 having a multiple quantum well structure, and a plurality of second semiconductor layers 330 arranged on the active layer 320 and doped with a polarity opposite to the polarity of the first semiconductor layer, the second semiconductor layers 330 being periodically arranged apart from each other in a first direction D1 and extending in a second direction D2 perpendicular to the first direction D1, where a pattern in which the active layer 320 and the second semiconductor layers 330 repeat in the first direction D1 may form a grating pattern. Mie resonance of incident light may occur in the active layer 320, and guided mode resonance of the incident light may occur along the grating pattern in the first direction D1. Therefore, the metaoptic 30 of the example embodiment may have a relatively high reflectance and a large phase shift near a resonance wavelength in a predetermined wavelength band, thereby providing a relatively high modulation efficiency.

The metaoptic 30 of the example embodiment may further include a substrate 50 on a lower side. For example, the substrate 50 may include a semiconductor material such as silicon (Si). However, embodiments are not limited thereto, and in another example, the substrate 50 may include another material. According to another example embodiment, the substrate 50 may include a dielectric material. For example, the substrate 50 may include silicon dioxide (SiO$_2$). However, embodiments are not limited thereto, and the substrate 50 may include another dielectric material.

The metaoptic 30 of the example embodiment may include the first semiconductor layer 310, the active layer 320, and the second semiconductor layers 330. Descriptions thereof are the same as those given above and thus are omitted.

The active layer 320 of the metaoptic 30 of the example embodiment may be formed such that incident light may focused without resonance. The thickness of the active layer 320 may be less than the wavelength of incident light. For incident light having a predetermined wavelength band, the thickness of the active layer 320 may be less than the center wavelength of the predetermined wavelength band, for example, less than ½ of the center wavelength of the predetermined wavelength band.

The second semiconductor layers 330 of the metaoptic 30 of the example embodiment may be spaced apart from each other in the first direction D1, and each of the second semiconductor layers 330 may extend in the second direction D2. A pattern in which the active layer 320 and the second semiconductor layers 330 are repeatedly arranged in the first direction D1 may form a grating pattern. Light incident on the metaoptic 30 may resonate in a guided mode along the grating pattern formed in the first direction D1.

The period of the second semiconductor layers 330 arranged in the first direction D1 may be less than the wavelength of incident light. The period of the second semiconductor layers 330 may be less than the wavelength of incident light. For incident light having a predetermined wavelength band, the period of the second semiconductor layers 330 may be less than the center wavelength of the predetermined wavelength band. However, the intervals between the second semiconductor layers 330 are not limited to having a period as described above, but may have alternating first and second periods or may be different from each other.

In addition, at least one of the second semiconductor layers 330 may have a width in the first direction D1, which is less than the wavelength of incident light, for example, less than ½ of the wavelength of incident light. The second semiconductor layers 330 may have the same width in the first direction D1 but are not limited thereto. For example, the second semiconductor layers 330 may have different widths in the first direction D1 or may have first and second widths, which are different from each other and alternate in the first direction D1. For incident light having a predetermined wavelength band, at least one of the second semiconductor layers 330 may have a width in the first direction D1, which is less than the center wavelength of the predetermined wavelength band, for example, less than ½ of the center wavelength of the predetermined wavelength band.

The thickness of at least one of the second semiconductor layers 330 may be less than the wavelength of incident light. The second semiconductor layers 330 may have the same thickness, but are not limited thereto. For example, the second semiconductor layers 330 may have different thicknesses or may have alternating first and second widths, which are different from each other. For incident light having a predetermined wavelength band, the thickness of at least one of the second semiconductor layers 330 may be less than the center wavelength of the predetermined wavelength band.

Figure 12:
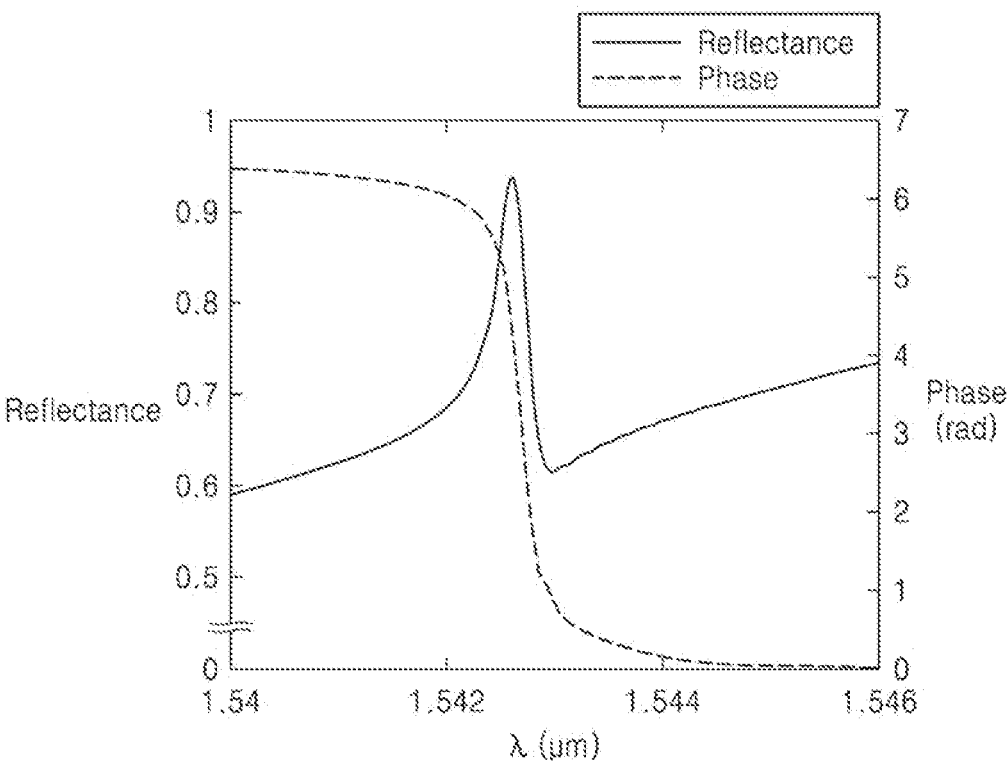
FIG. 12 is a graph illustrating the reflectance and the phase shifting ability of the metaoptic of the example embodiment with respect to wavelength in a given wavelength band.
Figure 13:
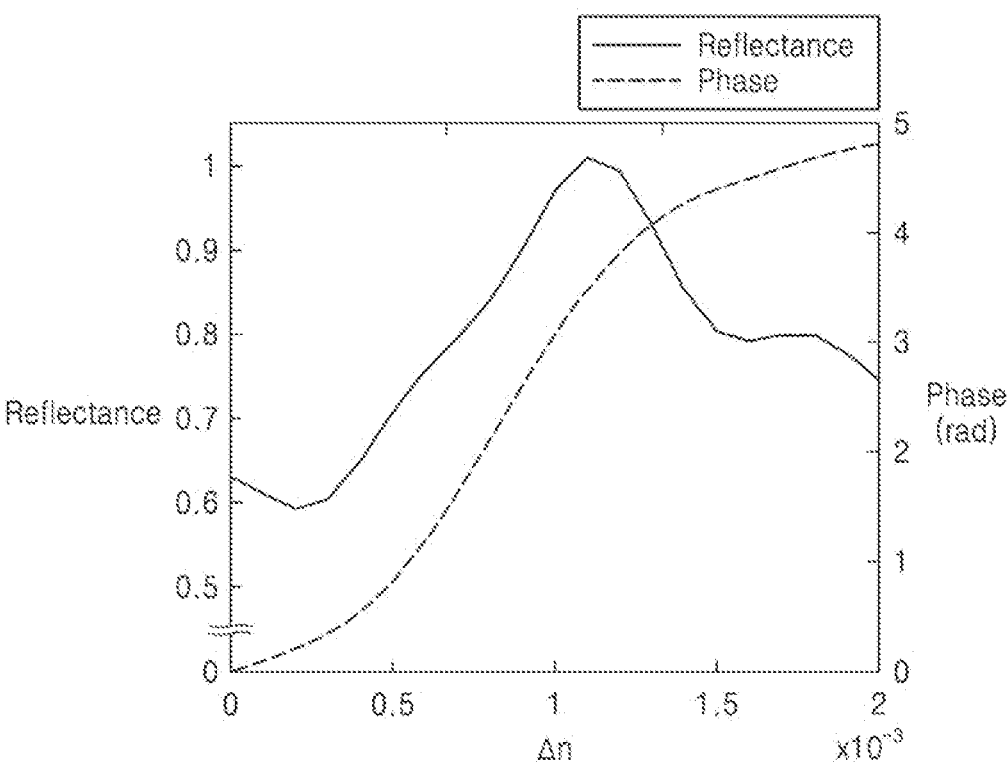
FIG. 13 is a graph illustrating the reflectance and the phase shifting ability of the metaoptic of the example embodiment with respect to refractive index variations (or electric field variations) at a wavelength of about 1546 nm.

FIG. 12 is a graph illustrating the reflectance and the phase shifting ability of the metaoptic 30 of the example embodiment with respect to wavelength in a given wavelength band, and FIG. 13 is a graph illustrating the reflectance and the phase shifting ability of the metaoptic 30 of the example embodiment with respect to refractive index variations (or electric field variations) at a wavelength of about 1546 nm.

The metaoptic 30 of the example embodiment may include: the substrate 50 including SiO$_2$; the first semiconductor layer 310 including InP doped with an n-type dopant; the active layer 320 including InP, and the second semiconductor layers 330 including InP doped with a p-type dopant. The thickness of the first semiconductor layer 310 may be about 500 nm, and the thickness of the active layer 320 may be about 500 nm. The period of the second semiconductor layers 330 may be about 950 nm, and the second semiconductor layers 330 may have a thickness of about 300 nm and a width of about 482 nm in the first direction D1.

The wavelength band of light incident on the metaoptic 30 of the example embodiment may include a visible wavelength band and an infrared wavelength band, for example, a wavelength of about 300 nm to about 1 mm. Light may be vertically incident on the metaoptic 30. Referring to FIG. 11, light may be vertically incident on the metaoptic 30 in a −z direction. In addition, incident light may be polarized in one direction. For example, incident light may be polarized in the first direction D1. However, embodiments are not limited thereto, and light may be incident at a predetermined angle with respect to one direction.

Referring to FIG. 12, reflectance may vary at the center wavelength of a wavelength band of about 1535 nm to about 1550 nm, for example, at a wavelength of about 1540 nm to about 1546 nm, and a reflectance dip may occur around a resonance wavelength of about 1543 nm. Due to the reflectance dip around the resonance wavelength, reflectance may be about 90% or more for a wavelength of about 1543 nm. The metaoptic 30 may have a relatively high reflectance on the level of about 50% in the entire wavelength region of about 1540 nm to about 1546 nm. For the reflectance dip around the resonance wavelength of about 1543 nm, the Q-factor of the metaoptic 30 may be greater than about 500, but is not limited thereto.

In addition, the maximum reflection phase shift of light in a wavelength band of about 1540 nm to about 1546 nm may be about 2π rad (or about 360°). This shows that the metaoptic 30 of the example embodiment may be operated in an over-coupling regime in which the maximum reflection phase shift of light may be greater than or equal to π rad (or 180°).

The metaoptic 30 of the example embodiment may have a relatively high light modulation efficiency because the metaoptic 30 has a relatively high reflectance on the level of about 50% or more in a given wavelength band, and the maximum reflection phase shift by the metaoptic 30 is about 2π rad with respect to wavelength variations, for example, a phase shift by the metaoptic 30 may range from about 0 rad to about 2π rad with respect to wavelength variations.

Referring to FIG. 13, the refractive index of the metaoptic 30 may vary at a wavelength of about 1543 nm according to a voltage applied by a voltage applying unit (or an electric field applied to the active layer 320). The reflectance of the metaoptic 30 may be about 50% or more while the refractive index of the metaoptic 30 varies. In the above example, the metaoptic 30 may have a reflectance of about 50% or more while the refractive index of the metaoptic 30 varies from about 0 to about 0.002, thereby providing high light modulation efficiency. In addition, while the refractive index of the metaoptic 30 varies, the maximum reflection phase shift of light may be about $\pi$ or more. In the above example, while refractive index of the metaoptic 30 varies from about 0 to about 0.002, the maximum phase shift of light may be about $1.5\pi$ rad (or about 270°).

The metaoptic 30 of the example embodiment has high reflectance on the level of 50% or more with respect to refractive index variations (with respect to a voltage applied thereto), and the maximum phase shift by the metaoptic 30 of the example embodiment is as high as about $1.5\pi$ rad with respect to refractive index variations (or with respect to an applied voltage), such that the metaoptic 30 may provide a relatively high light modulation efficiency.

Figure 14:
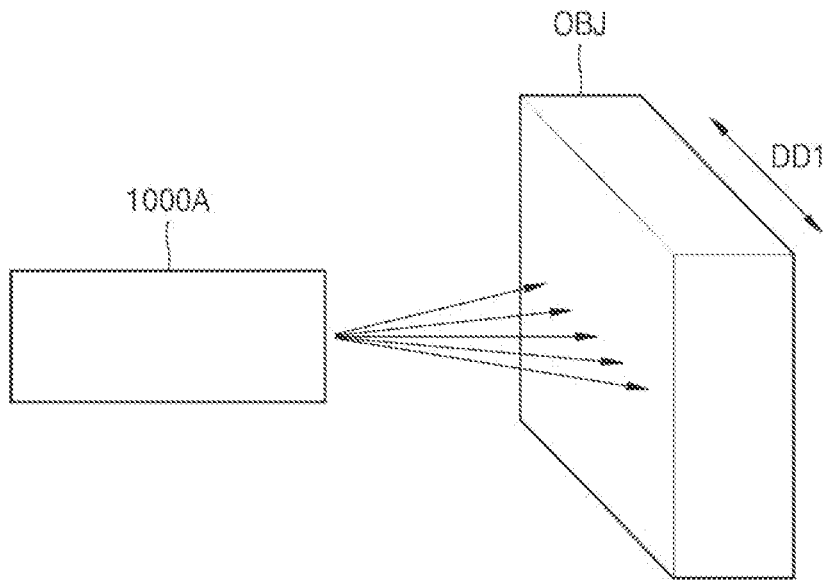
FIG. 14 is a conceptual view illustrating a beam steering device including a metaoptic according to an example embodiment.

FIG. 14 is a conceptual view illustrating a beam steering device 1000A including a metaoptic according to an example embodiment.

Referring to FIG. 14, a beam may be one-dimensionally steered using the beam steering device 1000A. For example, a beam traveling toward an object OBJ may be steered in a first direction DD1. The beam steering device 1000A may include a one-dimensional array of a plurality of metaoptics such as the metaoptics 10, 20, and 30 of the above example embodiments.

Figure 15:
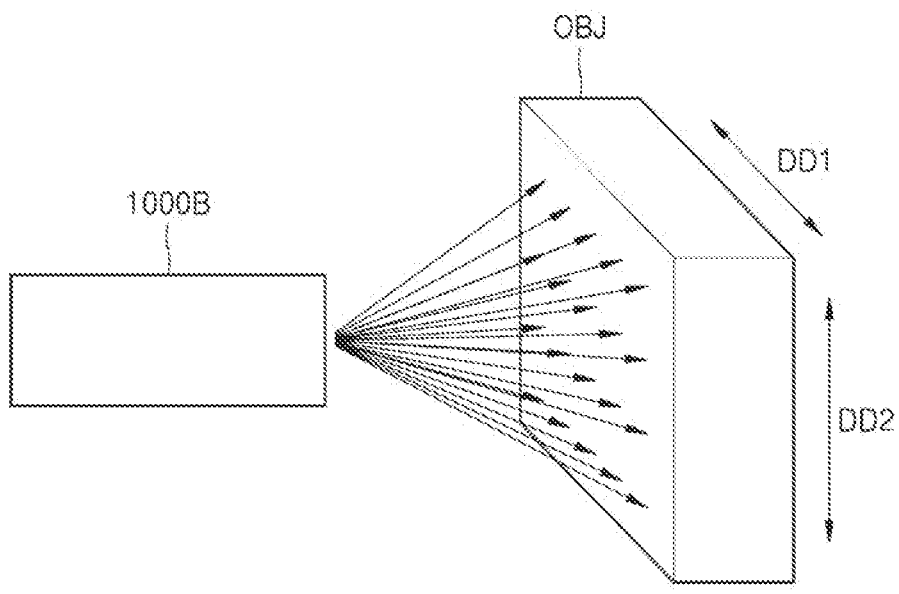
FIG. 15 is a conceptual view illustrating a beam steering device including a metaoptic according to an example embodiment.

FIG. 15 is a conceptual view illustrating a beam steering device 1000B including a metaoptic according to an example embodiment.

Referring to FIG. 15, a beam may be two-dimensionally steered using the beam steering device 1000B. That is, a beam traveling toward an object OBJ may be steered in a first direction DD1 and a second direction DD2 perpendicular to the first direction DD1. The beam steering device 1000B may include a two-dimensional array of a plurality of metaoptics such as the metaoptic 10 and the metaoptic 20 of the above example embodiments. The beam steering devices 1000A and 1000B described with reference to FIGS. 14 and 15 may non-mechanical beam scanning apparatuses.

Figure 16:
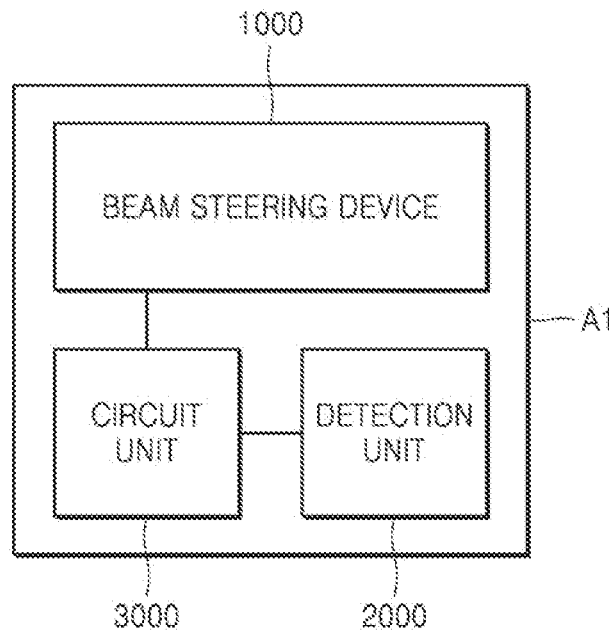
FIG. 16 is a block diagram illustrating an overall system of an electronic apparatus including a beam steering device to which a metaoptic is applied according to an example embodiment.

FIG. 16 is a block diagram illustrating an overall system of an electronic apparatus A1 including a beam steering device 1000 to which a metaoptic is applied according to an example embodiment.

Referring to FIG. 16, the electronic apparatus A1 may include the beam steering device 1000. The beam steering device 1000 may include the metaoptics 10, 20, and 30 of the example embodiments described with reference to FIGS. 1 to 13. The electronic apparatus A1 may include a light source unit (light source) in the beam steering device 1000 or a light source unit provided separately from the beam steering device 1000. The electronic apparatus A1 may include a detection unit 2000 configured to detect light steered by the beam steering device 1000 and reflected by an object. The detection unit 2000 may include a plurality of light detection elements, and may further include other optical members. In addition, the electronic apparatus A1 may further include a circuit unit 3000 connected to at least one of the beam steering device 1000 and the detection unit 2000. The circuit unit 3000 may include an arithmetic unit configured to obtain and calculate data, and may further include a driving unit and a control unit. In addition, the circuit unit 3000 may further include a power supply unit, a memory, or the like.

FIG. 16 illustrates that the electronic apparatus A1 includes the beam steering device 1000 and the detection unit 2000, which are provided in one apparatus. In another example, however, the beam steering device 1000 and the detection unit 2000 may be provided as separate apparatuses instead of being provided in one apparatus. In addition, the circuit unit 3000 may be connected to the beam steering device 1000 or the detection unit 2000 by wireless communication rather than by wired communication. In addition, the configuration shown in FIG. 16 may be variously modified.

The metaoptics 10, 20, and 30 of the above embodiments or the beam steering devices 1000A and 1000B including the metaoptics 10, 20, and 30 may be applied to various electronic apparatuses. For example, the beam steering devices 1000A and 1000B may be applied to light detection and ranging (LiDAR) apparatuses. The LiDAR apparatuses may be of a phase-shift type or a time-of-flight (TOF) type. In addition, the metaoptics 10, 20, and 30 or the beam steering devices 1000A and 1000B including the metaoptics 10, 20, and 30 may be applied to electronic apparatuses such as smartphones, wearable devices (such as augmented reality (AR) and virtual reality (VR) glasses-type devices), Internet of Things (IoT) devices, home appliances, tablet personal computers (PCs), personal digital assistants (PDAs), portable multimedia players (PMPs), navigations, drones, robots, driverless vehicles, autonomous vehicles, and advanced driver assistance systems (ADAS).

Figure 17:
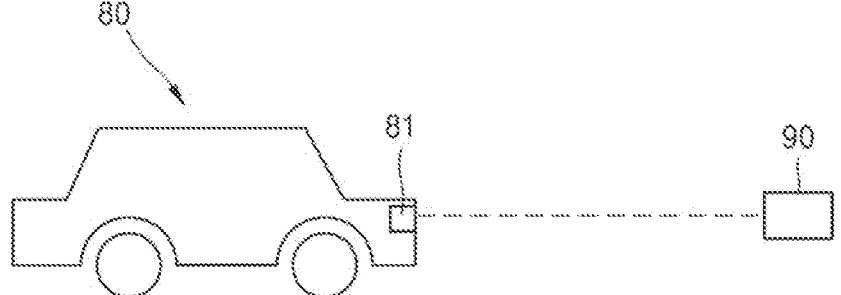
FIGS. 17 and 18 are conceptual views illustrating an example in which a light detection and ranging (LiDAR) apparatus including a metaoptic is applied to a vehicle according to an example embodiment.
Figure 18:
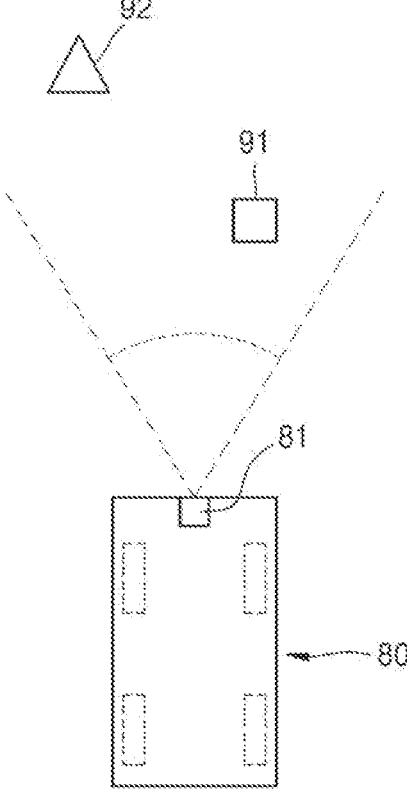

FIGS. 17 and 18 are conceptual views illustrating an example in which a LiDAR apparatus 81 including a metaoptic is applied to a vehicle 80 according to an example embodiment. FIG. 17 is a side view, and FIG. 18 is a plan view.

Referring to FIG. 17, the LiDAR apparatus 81 may be applied to the vehicle 80, and information on an object 90 may be obtained using the LiDAR apparatus 81. The vehicle 80 may an autonomous driving function. The LiDAR apparatus 81 may be used to detect an object or person such as the object 90 in a direction in which the vehicle 80 travels. In addition, the distance to the object 90 may be measured using information such as a time difference between a transmission signal and a detection signal. In addition, as shown in FIG. 18, information on a nearby object 91 and a distant object 92, which are within a scan range, may be acquired.

The metaoptics 10, 20, and 30 of the above example embodiments may be applied to various electronic apparatuses in addition to being applied to LiDAR apparatuses. For example, three-dimensional information on a space and an object may be obtained by scanning with the metaoptics 10, 20, and 30 of the example embodiments, and thus the metaoptics 10, 20, and 30 may be applied to three-dimensional image acquisition apparatuses or three-dimensional cameras. In addition, the metaoptics 10, 20, and 30 may be applied to holographic display apparatuses and structured light generation apparatuses. In addition, the metaoptics 10, 20, and 30 may be applied to various optical components/apparatuses such as beam scanning apparatuses, hologram generating apparatuses, light coupling apparatuses, variable focus lenses, and depth sensors. In addition, the metaoptics 10, 20, and 30 may be used in various fields in which "meta surfaces" or "meta structures" are used. In addition, the metaoptics 10, 20, and 30 of the example embodiments and the electronic apparatuses 1000A and 10006 including the metaoptics 10, 20, and 30 may be applied to various optical and electronic apparatuses for various purposes.

Figure 19:
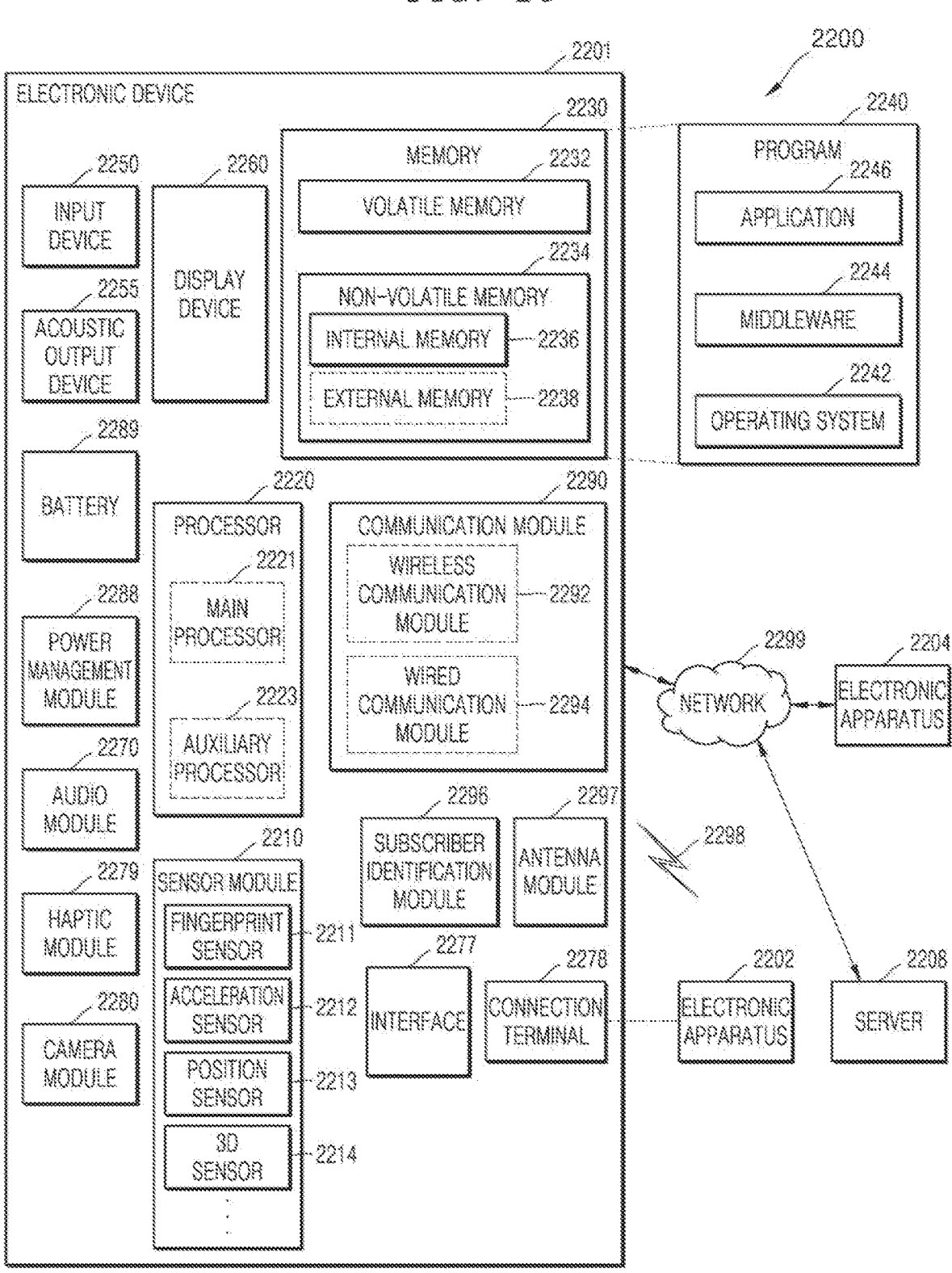
FIG. 19 is a block diagram illustrating a configuration of an electronic apparatus according to an example embodiment.

FIG. 19 is a block diagram illustrating a configuration of an electronic apparatus 2201 according to an embodiment.

Referring to FIG. 19, in a network environment 2200, the electronic apparatus 2201 may communicate with another electronic apparatus 2202 through a first network 2298 (a near-field wireless communication network or the like) or may communicate with another electronic apparatus 2204 and/or a server 2208 through a second network 2299 (a far-field wireless communication network or the like). The electronic apparatus 2201 may communicate with the electronic apparatus 2204 through the server 2208. The electronic apparatus 2201 may include a processor 2220, a memory 2230, an input device 2250, a sound output device 2255, a display device 2260, an audio module 2270, a sensor module 2210, an interface 2277, a haptic module 2279, a camera module 2280, a power management module 2288, a battery 2289, a communication module 2290, a subscriber identification module 2296, and/or an antenna module 2297. Some (the display device 2260, etc.) of the components may be omitted from the electronic apparatus 2201, or other components may be added to the electronic apparatus 2201. Some of the components may be implemented in one integrated circuit. For example, a fingerprint sensor 2211, an iris sensor, an illuminance sensor, or the like of the sensor module 2210 may be embedded in the display device 2260 (a display or the like).

The processor 2220 may execute software (a program 2240 or the like) to control one or more other components (hardware or software components, etc.) of the electronic apparatus 2201 connected to the processor 2220, and may perform a variety of data processing or operations. As a portion of the data processing or operations, the processor 2220 may load instructions and/or data received from other components (the sensor module 2210, the communication module 2290, etc.) into a volatile memory 2232, process the instructions and/or data stored in the volatile memory 2232, and store result data in a nonvolatile memory 2234. The processor 2220 may include a main processor 2221 (a central processing unit, an application processor, or the like) and an auxiliary processor 2223 (a GPU, an image signal processor, a sensor hub processor, a communication processor, or the like), which is operated independently or together with the main processor 2221. The auxiliary processor 2223 may consume less power than the main processor 2221 and may perform specialized functions.

The auxiliary processor 2223 may control functions and/or states related to some (the display device 2260, the sensor module 2210, the communication module 2290, etc.) of the components of the electronic apparatus 2201 on behalf of the main processor 2221 while the main processor 2221 is in an inactive (e.g., sleep) state or together with the main processor 2221 while the main processor 2221 is in an active (e.g., application execution) state. The auxiliary processor 2223 (an image signal processor, a communication processor, or the like) may be implemented as a portion of other functionally relevant components (the camera module 2280, the communication module 2290, etc.).

The memory 2230 may store a variety of data required by the components (the processor 2220, the sensor module 2210, etc.) of the electronic apparatus 2201. The data may include, for example, software (the program 2240, etc.) and input data and/or output data for commands related thereto. The memory 2230 may include the volatile memory 2232 and/or the nonvolatile memory 2234.

The program 2240 may be stored as software in the memory 2230, and may include an operating system 2242, middleware 2244, and/or an application 2246.

The input device 2250 may receive commands and/or data to be used for the components (the processor 2220, etc.) of the electronic apparatus 2201 from the outside (a user, etc.) of the electronic apparatus 2201. The input device 2250 may include a microphone, a mouse, a keyboard, and/or a digital pen (a stylus pen or the like).

The audio output device 2255 may output an audio signal to the outside of the electronic apparatus 2201. The audio output device 2255 may include a speaker and/or a receiver.

The speaker may be used for general purposes such as multimedia playback or record playback, and the receiver may be used to receive incoming calls. The receiver may be provided as a portion of the speaker or may be implemented as a separate device.

The display device 2260 may visually provide information to the outside of the electronic apparatus 2201. The display device 2260 may include a display, a hologram device, or a projector, and a control circuit for controlling devices. The display device 2260 may include touch circuitry set to sense a touch, and/or sensor circuitry (a pressure sensor, etc.) configured to measure the intensity of force generated by the touch.

The audio module 2270 may convert sound into an electrical signal, and vice versa. The audio module 2270 may obtain sound through the input device 2250, or may output sound through the audio output device 2255 and/or speakers and/or headphones of another electronic apparatus (the electronic apparatus 2202 or the like) directly or wirelessly connected to the electronic apparatus 2201.

The sensor module 2210 may detect an operating state (power, temperature, etc.) of the electronic apparatus 2201 or an external environmental state (user status, etc.), and may generate an electrical signal and/or a data value corresponding to the detected state. The sensor module 2210 may include the fingerprint sensor 2211, an acceleration sensor 2212, a position sensor 2213, and a 3D sensor 2214, and may further include an iris sensor, a gyro sensor, a barometric sensor, a magnetic sensor, a grip sensor, a proximity sensor, a color sensor, an infrared (IR) sensor, a biological sensor, a temperature sensor, a humidity sensor, and/or an illuminance sensor.

The 3D sensor 2214 may sense the shape, movement, or the like of an object by emitting light to the object and analyzing light reflected from the object, and to this end, the 3D sensor 2214 may include any one of the metaoptics 10, 20, and 30.

The interface 2277 may support one or more designated protocols, which may be used to directly or wirelessly connect the electronic apparatus 2201 with other electronic apparatuses (the electronic apparatus 2202, etc.). The interface 2277 may include a high definition multimedia interface (HDMI), a universal serial bus (USB) interface, a secure digital (SD) card interface, and/or an audio interface.

A connection terminal 2278 may include a connector through which the electronic apparatus 2201 may be physically connected to other electronic apparatuses (the electronic apparatus 2202, etc.). The connection terminal 2278 may include an HDMI connector, a USB connector, an SD card connector, and/or an audio connector (a headphone connector, etc.).

The haptic module 2279 may convert an electrical signal into a mechanical stimulus (vibration, movement, etc.) or an electrical stimulus that a user may perceive through tactile sensation or kinesthesia. The haptic module 2279 may include a motor, a piezoelectric element, and/or an electric stimulation device.

The camera module 2280 may capture a still image and a moving image. The camera module 2280 may include may include a lens assembly including at least one lens, image sensors, image signal processors, and/or flashes. The lens assembly included in the camera module 2280 may collect light coming from an object to be imaged, and one of the metaoptics 10, 20, and 30 of the above embodiments may be included in the lens assembly.

The power management module 2288 may manage power supplied to the electronic apparatus 2201. The power management module 2288 may be implemented as a portion of a power management integrated circuit PMIC.

The battery 2289 may supply power to components of the electronic apparatus 2201. The battery 2289 may include a non-rechargeable primary battery, a rechargeable secondary battery, and/or a fuel cell.

The communication module 2290 may support establishment of a direct (wired) communication channel and/or a wireless communication channel between the electronic apparatus 2201 and other electronic apparatuses (the electronic apparatus 2202, the electronic apparatus 2204, the server 2208, etc.), and communication through the established communication channel. The communication module 2290 operates independently of the processor 2220 (an application processor, etc.) and may include one or more communication processors supporting direct communication and/or wireless communication. The communication module 2290 may include a wireless communication module 2292 (a cellular communication module, a short-range wireless communication module, a global navigation satellite system (GNSS), or the like) and/or a wired communication module 2294 (a local area network (LAN) communication module, a power line communication module, or the like). A corresponding communication module from among these communication modules may communicate with other electronic apparatuses through the first network 2298 (a local area network such as Bluetooth, WiFi Direct, or infrared data association (IrDA)) or the second network 2299 (a telecommunication network such as a cellular network, the Internet, or computer networks (LAN, WAN, etc.)). These various types of communication modules may be integrated into a single component (a single chip or the like) or may be implemented as a plurality of separate components (multiple chips). The wireless communication module 2292 may identify and authenticate the electronic apparatus 2201 within a communication network such as the first network 2298 and/or the second network 2299 using subscriber information (an international mobile subscriber identifier (IMSI), etc.) stored in the subscriber identity module 2296.

The antenna module 2297 may transmit and/or receive signals and/or power to and/or from the outside (other electronic apparatuses, etc.). An antenna may include a radiator made of a conductive pattern formed on a substrate (a PCB, etc.). The antenna module 2297 may include one or more such antennas. When a plurality of antennas are included in the antenna module 2297, the communication module 2290 may select an antenna suitable for a communication method used in a communication network, such as the first network 2298 and/or the second network 2299, among the plurality of antennas. Signals and/or power may be transmitted or received between the communication module 2290 and other electronic apparatuses through the selected antenna. Other components (an RFIC, etc.) besides the antenna may be included as part of the antenna module 2297.

Some of the components may be connected to each other and exchange signals (commands, data, etc.) through a communication method between peripheral devices (a bus, general purpose input and output (GPIO), a serial peripheral interface (SPI), a mobile industry processor interface (MIPI), or the like).

Commands or data may be transmitted or received between the electronic apparatus 2201 and an external apparatus such as the electronic apparatus 2204 through the server 2208 connected to the second network 2299. The other electronic apparatuses 2202 and 2204 may be the same as or different from the electronic apparatus 2201. All or some of the operations of the electronic apparatus 2201 may be executed by one or more of the other electronic apparatuses 2202, 2204, and 2208. For example, when the electronic apparatus 2201 needs to perform certain functions or services, the electronic apparatus 2201 may request one or more other electronic apparatuses to perform some or all of the functions or services instead of directly executing the functions or services. One or more other electronic apparatuses that have received the request may execute an additional function or service related to the request, and may transfer results of the execution to the electronic apparatus 2201. To this end, cloud computing, distributed computing, and/or client-server computing techniques may be used.

Figure 20:
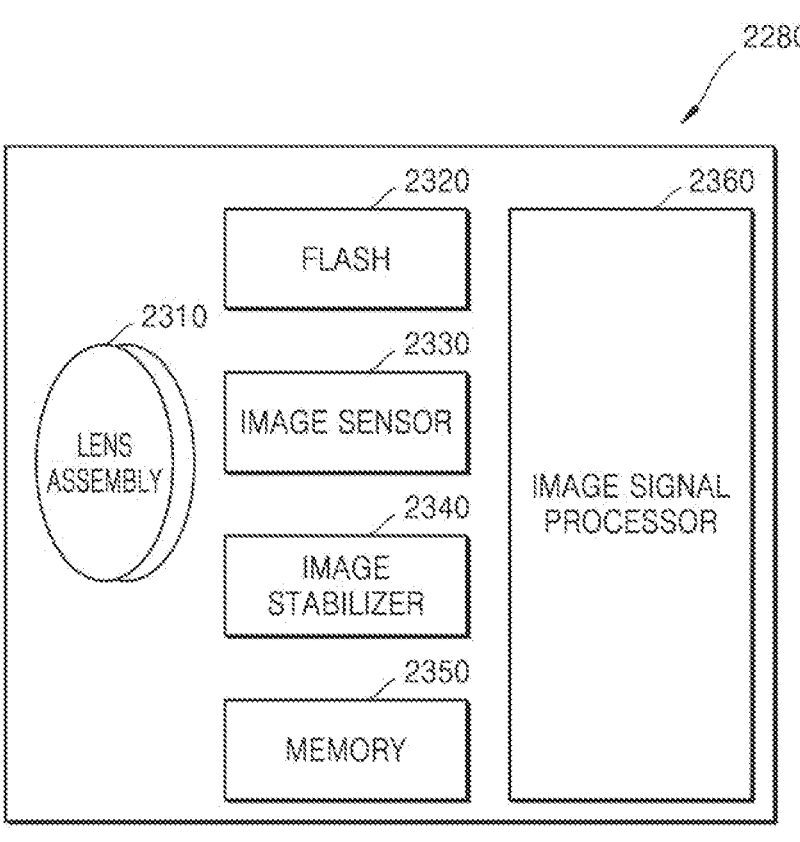
FIG. 20 is a block diagram illustrating a configuration of a camera module included in the electronic apparatus shown in FIG. 19.

FIG. 20 is a block diagram illustrating a configuration of the camera module 2280 included in the electronic apparatus 2201 shown in FIG. 19.

Referring to FIG. 20, the camera module 2280 may include a lens assembly 2310, a flash 2320, an image sensor 2330, an image stabilizer 2340, a memory 2350 (a buffer memory, etc.), and/or an image signal processor 2360. The lens assembly 2310 may collect light coming from an object to be imaged and may include one of the metaoptics 10, 20, and 30 described above. The lens assembly 2310 may include one or more refractive lenses and a light modulator. The light modulator provided in the lens assembly may be designed as a lens having a phase profile and a compensation structure to reduce phase discontinuity. The lens assembly 2310 including the light modulator may realize desired optical performance and may have a short optical length.

The camera module 2280 may further include an actuator. For example, the actuator may move lens elements of the lens assembly 2310 and adjust the distances between the lens elements for zooming and/or autofocusing (AF).

The camera module 2280 may include a plurality of lens assemblies 2310, and in this case, the camera module 2280 may be a dual camera, a 360-degree camera, or a spherical camera. Some of the lens assemblies 2310 may have the same lens properties (field of view, focal length, autofocus, F Number, optical zoom, etc.) or different lens properties. Each of the lens assemblies 2310 may include a wide-angle lens or a telephoto lens.

The flash 2320 may emit light used to enhance light emitted or reflected from an object. The flash 2320 may include one or more light emitting diodes (a red-green-blue (RGB) LED, a white LED, an infrared LED, an ultraviolet LED, etc.), and/or a xenon lamp. The image sensor 2330 may obtain an image corresponding to an object by converting light emitted or reflected from the object and transmitted through the lens assembly 2310 into an electrical signal. The image sensor 2330 may include one or more sensors selected from image sensors having different properties, such as an RGB image sensor, a black and white (BW) sensor, an infrared sensor, or an ultraviolet sensor. Each of the sensors included in the image sensor 2330 may be implemented as a charge-coupled device (CCD) sensor and/or a complementary metal oxide semiconductor (CMOS) sensor.

The image stabilizer 2340 may move one or more lenses included in the lens assembly 2310 or the image sensor 2330 in a specific direction in response to a movement of the camera module 2280 or the electronic apparatus 2201 including the camera module 2280, or may control operating characteristics of the image sensor 2330 (adjustment of read-out timing, etc.) to compensate for negative effects caused by movement. The image stabilizer 2340 may detect a movement of the camera module 2280 or the electronic apparatus 2201 by using a gyro sensor (not shown) or an acceleration sensor (not shown) arranged inside or outside the camera module 2280. The image stabilizer 2340 may be an optical image stabilizer.

In the memory 2350, some or all of data obtained through the image sensor 2330 may be stored for the next image processing operation. For example, when a plurality of images are obtained at a high speed, the obtained original data (Bayer-patterned data, high-resolution data, or the like) may be stored in the memory 2350 and only a low-resolution image may be displayed. Then, the original data of a selected image (user selection, etc.) may be transferred to the image signal processor 2360. The memory 2350 may be integrated into the memory 2230 of the electronic apparatus 2201 or may be configured as a separate memory that may be independently operated.

The image signal processor 2360 may perform one or more image processes on an image acquired through the image sensor 2330 or image data stored in the memory 2350. The one or more image processes may include depth map generation, three-dimensional modeling, panorama generation, feature point extraction, image synthesis, and/or image compensation (noise reduction, resolution adjustment, brightness adjustment, blurring, sharpening, softening, etc.). The image signal processor 2360 may control (exposure time control, read-out timing control, etc.) components (the image sensor 2330, etc.) included in the camera module 2380. An image processed by the image signal processor 2360 may be stored again in the memory 2350 for additional processing or may be provided to external components (the memory 2230, the display device 2260, the electronic apparatus 2202, the electronic apparatus 2204, the server 2208, etc.) of the camera module 2280. The image signal processor 2360 may be integrated into the processor 2220 or may be configured as a separate processor that operates independently of the processor 2220. When the image signal processor 2360 is provided separately from the processor 2220, an image processed by the image signal processor 2360 may be displayed on the display device 2260 after being further processed by the processor 2220.

The electronic apparatus 2201 may include a plurality of camera modules 2280 having different attributes or functions. In this case, one of the plurality of camera modules 2280 may be a wide-angle camera, and another of the plurality of camera modules 2280 may be a telephoto camera. Similarly, one of the plurality of camera modules 2280 may be a front camera, and another of the plurality of camera modules 2280 may be a rear camera.

Figure 21:
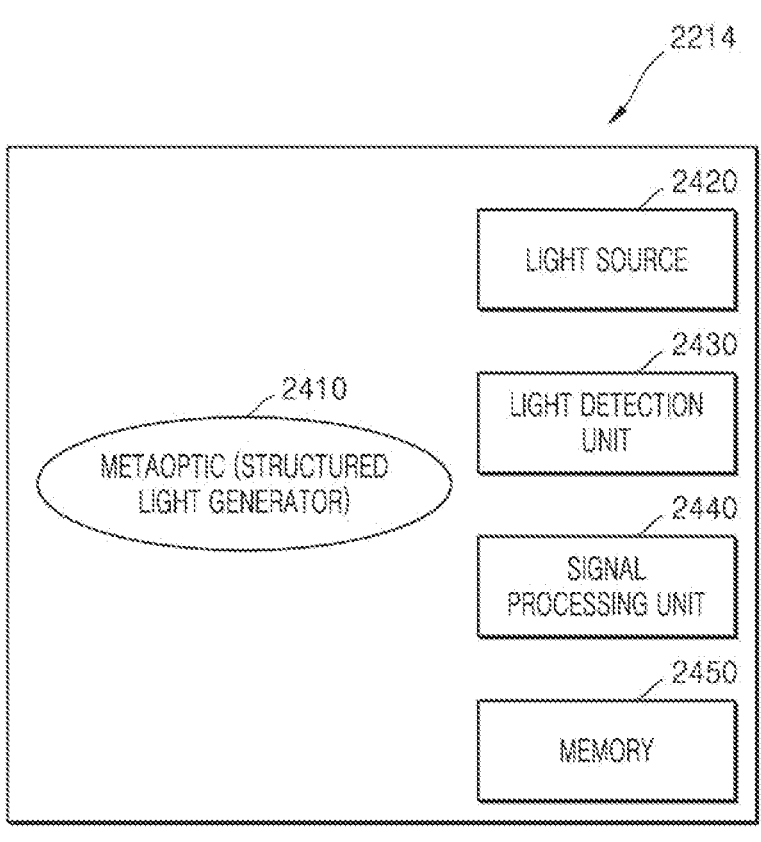
FIG. 21 is a block diagram illustrating a configuration of a 3D sensor provided in the electronic apparatus shown in FIG. 19.

FIG. 21 is a block diagram schematically illustrating a configuration of the 3D sensor 2214 provided in the electronic apparatus 2201 shown in FIG. 19.

The 3D sensor 2214 senses the shape, movement, or the like of an object by emitting light toward the object and receiving and analyzing light reflected from the object. The 3D sensor 2214 includes a light source 2420, a light modulator 2410, a light detection unit 2430, a signal processing unit 2440, and a memory 2450. Any one of the metaoptics 10, 20, and 30 of the above-described embodiments may be employed as the light modulator 2410, and a target phase delay profile may be set in the light modulator 2410 such that the light modulator 2410 may function as a beam deflector or a beam shaper.

The light source 2420 emits light to be used for analyzing the shape or position of an object. The light source 2420 may include a light source configured to generates and output light in a small wavelength. The light source 2420 may include a laser diode (LD), a light emitting diode (LED), a super luminescent diode (SLD), or the like, which is configured to generate and output light in a wavelength band suitable for analyzing the position and shape of the object, for example, an infrared wavelength band. The light source 2420 may be a tunable LD. The light source 2420 may generate and output light in different wavelength bands. The light source 2420 may generate and output pulsed light or continuous light.

The light modulator 2410 modulates light emitted from the light source 2420 and sends the modulated light to the object. When the light modulator 2410 is a beam deflector, the light modulator 2410 may deflect incident light in a predetermined direction to direct the light toward the object. When the light modulator 2410 is a beam shaper, the light modulator 2410 may modulate incident light such that the light may be distributed in a predetermined pattern. The light modulator 2410 may form structured light which is to be used for 3D shape analysis.

As described above, the light modulator 2410 may set a phase delay dispersion ($\partial\varphi/\partial\lambda$) to be zero or a positive or negative number and implement a continuous phase delay profile. Therefore, the light modulator 2410 may perform achromatic light modulation without deviations according to wavelengths. Conversely, the light modulator 2410 may modulate light by enhancing deviations according to wavelengths to vary the direction of deflection according to wavelengths or form different beam patterns according to wavelengths and may then direct the light to the object.

The light detection unit 2430 receives light emitted to the object through the light modulator 2410 and reflected from the object. The light detection unit 2430 may include an array of a plurality of sensors configured to sense light, or may include only one sensor configured to sense light.

The signal processing unit 2440 may process a signal sensed by the light detection unit 2430 to analyze the shape of the object. The signal processing unit 2440 may analyze a 3D shape of the object including the depth position of the object.

For the 3D shape analysis, a calculation for measuring the time of flight of light may be performed. Various arithmetic methods may be used to measure the time of flight of light. For example, in a direct time measurement method, the distance to the object is calculated by measuring, with a timer, the time period during which pulsed light is emitted toward the object and reflected back from the object. In a correlation method, the distance to the object is measured by emitting pulsed light toward the object and measuring the brightness of light reflected back from the object. In a phase delay measurement method, the phase difference between continuous-wave light such as sinewave light emitted to the object and light reflected back from the object is sensed and converted to a distance.

When structured light is emitted to the object, the depth position of the object may be calculated from a change in the pattern of structured light reflected back from the object, that is, from results of comparison between the pattern of structured light emitted to the object and the pattern of structured light reflected from the object. Information on the depth of the object may be extracted by tracking changes in the pattern of the reflected structured light for each coordinate, and 3D information on the shape and the movement of the object may be obtained from the extracted information.

The memory 2450 may store programs and other data to be used for the operation of the signal processing unit 2440.

Results of the calculation of the signal processing unit 2440, that is, information on the shape and position of the object may be transmitted to another unit of the electronic apparatus 2201 or to another electronic apparatus. For example, the information may be used by the application 2246 stored in the memory 2230 of the electronic apparatus 2201. The other electronic apparatus to which the results are transmitted may be a display device or a printer configured to output the results. In addition, examples of the other electronic apparatus include autonomous driving devices, such as unmanned vehicles, autonomous vehicles, robots, drones, etc., smart phones, smart watches, mobile phones, PDAs, laptop computers, PCs, various wearable devices, other mobile or non-mobile computing devices, and IoT devices.

Figure 22:
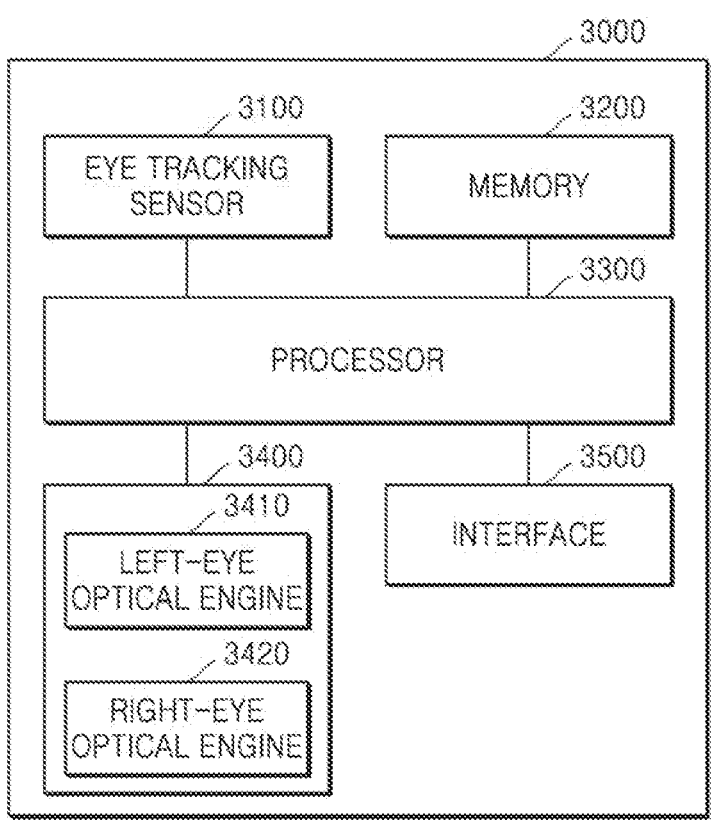
FIG. 22 is a block diagram illustrating a configuration of an electronic apparatus according to an example embodiment.

FIG. 22 is a block diagram illustrating a configuration of an electronic apparatus 3000 according to an example embodiment.

The electronic apparatus 3000 shown in FIG. 22 may include an AR device. The electronic apparatus 3000 includes a display engine 3400, a processor 3300, an eye tracking sensor 3100, an interface 3500, and a memory 3220.

The processor 3300 may control the overall operation of the AR device including the display engine 3400 by driving an operating system or an application program, and may process and calculate various pieces of data including image data. For example, the processor 3300 may process image data, which is rendered to have binocular disparity and includes a left-eye virtual image and a right-eye virtual image.

The interface 3500 is for inputting or outputting external data or operation commands and may include, for example, a user interface operable by a user such as a touch pad, a controller, or a manipulation button. The interface 3500 may include a wired communication module such as a USB module or a wireless communication module such as Bluetooth, and may receive, through the wired or wireless communication module, user manipulation information or virtual image data transmitted from an interface included in an external device.

The memory 3200 may include an embedded memory such as a volatile memory or a non-volatile memory. The memory 3200 may store various pieces of data, programs, or applications, which are used by the processor 3300 for driving and controlling the AR device, and input/output signals or virtual image data.

The display engine 3400 is configured to receive image data generated by the processor 3300 to generate virtual image light, and includes a left-eye optical engine 3410 and a right-eye optical engine 3420. Each of the left-eye optical engine 3410 and the right-eye optical engine 3420 includes a light source configured to output light, and a display panel configured to form a virtual image using the light output from the light source, and thus has a function like a small projector. The light source may include, for example, an LED, and the display panel may include, for example, liquid crystal on silicon (LCoS).

The eye tracking sensor 3100 may be mounted at a position at which a pupil of a user wearing the AR device is trackable, and may transmit a signal corresponding to information on the gaze of the user to the processor 3100. The eye tracking sensor 3100 may detect gaze information such as a gaze direction in which the eyes of the user are directed, user's pupil positions, or pupil center position coordinates. The processor 3300 may determine an eye movement type based on user's gaze information detected by the eye tracking sensor 3100. For example, based on gaze information obtained from the eye tracking sensor 3100, the processor 3300 may determine various gaze movements such as a fixation of gaze to one point, a pursuit of a moving object, and a rapid movement (saccade) from one gaze point to another gaze point.

Figure 23:
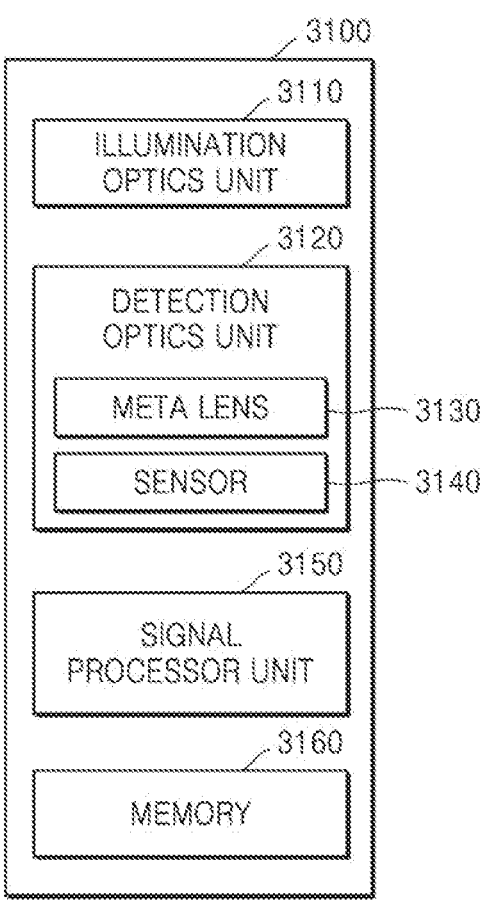
FIG. 23 is a block diagram illustrating a configuration of an eye tracking sensor provided in the electronic apparatus shown in FIG. 22.

FIG. 23 is a block diagram illustrating a configuration of the eye tracking sensor 3100 provided in the electronic apparatus 3000 shown in FIG. 22.

The eye tracking sensor 3100 includes an illumination optical unit 3110, a detection optical unit 3120, a signal processing unit 3150, and a memory 3160. The illumination optical unit 3110 may include a light source configured to emit light, for example, infrared light, to the position of an object (user's eye). The detection optical unit 3150 detects reflected light, and may include a meta lens 3130 and a sensor unit 3140. The signal processing unit 3150 calculates, for example, the pupil positions of a user from results of sensing by the detection optical unit 3120.

Any one, a combination, or a modification of the metaoptics 10, 20, and 30 of the above example embodiments may be used as the meta lens 3130. The meta lens 3130 may focus light coming from the object on the sensor unit 3140. The incident angle of light, which is incident on the sensor unit 3140 of the eye tracking sensor 3100 positioned very close to a user's eye, may be, for example, about 30 degrees or more. The meta lens 3130 has a structure having a compensation area, and a decrease in the efficiency of the meta lens 3130 is small even for light having a large incident angle. Therefore, the accuracy of eye tracking may be increased.

A glasses-type device may be used not only as an AR device but also as a VR device, and thus a user's gaze on a VR image provided from the glasses-type device may be tracked.

As described above, according to the one or more of the above embodiments, the metaoptic has a relatively low absorption coefficient, a relatively high reflectance, and a relatively high phase shifting ability in a predetermined wavelength band, thereby providing a relatively high modulation efficiency.

According to the one or more of the above example embodiments, the refractive index of the active layer of the metaoptic may vary at the center wavelength of the predetermined wavelength band in response to an electric field applied to the active layer, and the metaoptic may have high reflectance and a relatively high phase shifting ability in a refractive index variation region, thereby providing a relatively high light modulation efficiency.

The metaoptic of the one or more of the above example embodiments may be used in various electronic apparatuses such as a beam steering device and a LiDAR apparatus.

It should be understood that example embodiments described herein should be considered in a descriptive sense only and not for purposes of limitation. Descriptions of features or aspects within each example embodiment should typically be considered as available for other similar features or aspects in other embodiments. While example embodiments have been described with reference to the figures, it will be understood by those of ordinary skill in the art that various changes in form and details may be made therein without departing from the spirit and scope as defined by the following claims and their equivalents.

What is claimed is:

1. A metaoptic configured to modulate incident light in a wavelength band, the metaoptic comprising:
   a plurality of meta units, each of the plurality of meta units comprising:
      a first semiconductor layer;

an active layer provided on the first semiconductor layer, the active layer having a multiple quantum well structure and a refractive index variable based on a voltage applied thereto; and a second semiconductor layer provided on the active layer and doped with a polarity opposite to a polarity of the first semiconductor layer, wherein at least one of the plurality of meta units comprises a plurality of first elements having a cylindrical shape and periodically spaced apart from each other in a first direction, and a plurality of second elements connecting the plurality of first elements to each other, wherein the plurality of meta units are provided in a second direction that is perpendicular to the first direction, and wherein a thickness of at least one of the plurality of first elements is less than a center wavelength of the wavelength band.

2. The metaoptic of claim 1, further comprising a distributed Bragg reflector layer provided on a side of the plurality of meta units.

3. The metaoptic of claim 1, wherein the plurality of first elements are configured such that the incident light undergoes Mie resonance, and wherein the plurality of first elements and the plurality of second elements are configured such that the incident light undergoes guided mode resonance in the first direction.

4. The metaoptic of claim 1, wherein at least one of the plurality of second elements has a rectangular cross-section.

5. The metaoptic of claim 1, wherein voltages are independently applied to the plurality of meta units.

6. The metaoptic of claim 1, wherein a period of the plurality of first elements is less than the center wavelength of the wavelength band, and wherein a period of the plurality of meta units provided in the second direction is less than the center wavelength of the wavelength band.

7. The metaoptic of claim 1, wherein a diameter of at least one of the plurality of first elements having the cylindrical shape is less than ½ of the center wavelength of the wavelength band.

8. The metaoptic of claim 1, wherein a thickness of at least one of the plurality of second elements is equal to a thickness of adjacent one of the plurality of first elements.

9. The metaoptic of claim 1, wherein, when an electric field of 100 kV/cm is applied to the active layer, the metaoptic has an absorption coefficient less than or equal to 240 cm$^{-1}$ in the wavelength band.

10. The metaoptic of claim 1, wherein a difference between a refractive index of the active layer when an electric field of about 100 kV/cm is applied to the active layer and a refractive index of the active layer when no electric field is applied to the active layer is 0.001 or more.

11. The metaoptic of claim 1, wherein the first semiconductor layer, the active layer, and the second semiconductor layer comprise a Group III-V compound semiconductor material, and wherein the center wavelength of the wavelength band is 300 nm to 1 mm.

12. The metaoptic of claim 1, wherein the active layer comprises at least one of gallium arsenide (GaAs), indium gallium arsenide (InGaAs), gallium nitride (GaN), aluminum gallium nitride (AlGaN), indium phosphide (InP), and gallium phosphide (GaP).

13. The metaoptic of claim 1, wherein the wavelength band ranges from 1520 nm to 1580 nm, wherein the plurality of meta units comprise indium phosphide (InP) and have a period that ranges from 300 nm to 1500 nm, wherein the plurality of first elements, having the cylindrical shape, have a period that ranges from 300 nm to 1500 nm, a diameter that ranges from 100 nm to 600 nm, and a thickness that ranges from 300 nm to 1500 nm, and wherein the plurality of second elements have a width that ranges from 100 nm to 500 nm and a thickness that ranges from 300 nm to 1500 nm.

14. The metaoptic of claim 1, wherein, in the wavelength band, the metaoptic has a reflectance that is greater than or equal to 90%, and a maximum phase shift by the metaoptic based on wavelength variations is greater than or equal to π rad, or the metaoptic has a reflectance that is greater than or equal to 90% in a refractive index variation region for light having a wavelength in the wavelength band, and a maximum phase shift by the metaoptic based on refractive index variations is greater than or equal to π rad.

15. A metaoptic for modulating incident light in a wavelength band, the metaoptic comprising:

a dielectric layer; and a plurality of first meta units having a cylindrical shape, the plurality of first meta units being periodically provided on the dielectric layer and spaced apart from each other in a first direction and a second direction perpendicular to the first direction, wherein each of the plurality of first meta units comprises:

a first semiconductor layer;

an active layer provided on the first semiconductor layer, the active layer having a multiple quantum well structure and a refractive index variable based on a voltage applied thereto; and a second semiconductor layer provided on the active layer and doped with a polarity opposite to a polarity of the first semiconductor layer, wherein voltages are independently applied to the plurality of first meta units, wherein the plurality of first meta units are configured to two-dimensionally steer the incident light, and wherein a thickness of at least one of the plurality of first meta units is less than a center wavelength of the wavelength band.

16. The metaoptic of claim 15, wherein, in the wavelength band, a maximum phase shift by wavelength variations is greater than or equal to π rad, or a maximum phase shift by refractive index variations in the wavelength band is greater than or equal to π rad.

17. The metaoptic of claim 15, wherein one of the plurality of first meta units is configured such that the incident light undergoes localized Mie resonance.

18. The metaoptic of claim 15, wherein at least one of the plurality of first meta units having the cylindrical shape has a diameter less than the center wavelength of the wavelength band.

19. The metaoptic of claim 15, further comprising a plurality of second meta units which are parallel to the first direction and connect the first meta units adjacent to each other, wherein the incident light undergoes guided mode resonance along the first meta units adjacent to each other and the plurality of second meta units parallel to the first direction.

20. A metaoptic for modulating incident light in a predetermined wavelength band, the metaoptic comprising:

a first semiconductor layer;

an active layer provided on the first semiconductor layer, the active layer having a multiple quantum well structure and a refractive index variable based on a voltage applied thereto; and a plurality of second semiconductor layers provided on the active layer and doped with a polarity opposite to a polarity of the first semiconductor layer, the plurality of second semiconductor layers being periodically spaced apart from each other in a first direction and extending in a second direction perpendicular to the first direction, wherein a grating pattern is formed by a pattern in which the active layer and the plurality of second semiconductor layers repeat in the first direction, and wherein, in the wavelength band, the metaoptic has a reflectance that is greater than or equal to 50%, and a maximum phase shift by the metaoptic based on wavelength variations is greater than or equal to $\pi$ rad, or the metaoptic has a reflectance that is greater than or equal to 50% or more in a refractive index variation region for light having a wavelength in the wavelength band, and a maximum phase shift by the metaoptic based on refractive index variations is greater than or equal to $\pi$ rad.

21. The metaoptic of claim 20, wherein the active layer is configured such that the incident light undergoes Mie resonance, and wherein the grating pattern in the first direction is configured such that the incident light undergoes guided mode resonance.

* * * * *